US010997565B2

(12) United States Patent
Ave et al.

(10) Patent No.: US 10,997,565 B2
(45) Date of Patent: May 4, 2021

(54) CONSOLIDATION OF CALENDAR APPOINTMENTS

(71) Applicant: Square, Inc., San Francisco, CA (US)

(72) Inventors: Willem Ave, San Francisco, CA (US); Walter Jew, Hayward, CA (US); Ryan J. Mitchell, Berkeley, CA (US); Michael Morrissey Cieri, San Francisco, CA (US); Evan Ginsburg, San Francisco, CA (US); Scott Malish, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 326 days.

(21) Appl. No.: 14/735,966

(22) Filed: Jun. 10, 2015

(65) Prior Publication Data

US 2020/0265387 A1     Aug. 20, 2020

(51) Int. Cl.
*G06Q 10/00*     (2012.01)
*G06Q 10/10*     (2012.01)

(52) U.S. Cl.
CPC ................ *G06Q 10/1095* (2013.01)

(58) Field of Classification Search
CPC combination set(s) only.
See application file for complete search history.

(56) References Cited

U.S. PATENT DOCUMENTS

| | | | |
|---|---|---|---|
| 6,112,185 A | 8/2000 | Walker et al. |
| 6,266,649 B1 | 7/2001 | Linden et al. |
| 6,529,880 B1 | 3/2003 | McKeen et al. |
| 6,748,364 B1 | 6/2004 | Waytena et al. |
| 6,845,361 B1 | 1/2005 | Dowling |
| 6,868,391 B1 | 3/2005 | Hultgren |
| 6,973,437 B1 | 12/2005 | Olewicz et al. |
| 7,069,228 B1 | 6/2006 | Rose et al. |
| 7,082,402 B2 | 7/2006 | Conmy et al. |

(Continued)

FOREIGN PATENT DOCUMENTS

| | | |
|---|---|---|
| AU | 2018260870 A1 | 11/2018 |
| WO | 01/53991 A1 | 7/2001 |

(Continued)

OTHER PUBLICATIONS

Och, F.J., and Weber, H.,"Improving Statistical Natural Language Translation with Categories and Rules," pp. 985-989 (Year: 1998).

(Continued)

*Primary Examiner* — Rutao Wu
*Assistant Examiner* — Scott M Ross
(74) *Attorney, Agent, or Firm* — Lee & Hayes, P.C.

(57) ABSTRACT

Techniques for processing calendar availability and consolidating appointments are described herein. In some implementations, the techniques may monitor scheduling interactions of a merchant with a calendar to schedule a merchant as unavailable in the calendar at a particular time and/or to reschedule the merchant as available at a time that is designated as unavailable. Additionally, or alternatively, the techniques may consolidate a merchant's schedule by rescheduling appointments when particular criteria are satisfied. Further, the techniques may include other features to manage a calendar and/or enhance a merchant's experience in scheduling appointments.

20 Claims, 11 Drawing Sheets

(56) References Cited

U.S. PATENT DOCUMENTS

| | | |
|---|---|---|
| 7,328,166 B1 | 2/2008 | Geoghegan et al. |
| 7,620,562 B2 | 11/2009 | Henry et al. |
| 7,933,789 B2 | 4/2011 | Boland et al. |
| 8,166,121 B2 | 4/2012 | Farrell et al. |
| 8,244,566 B1* | 8/2012 | Coley .................. G06Q 10/109 |
| | | 705/7.11 |
| 8,498,900 B1 | 7/2013 | Spirin et al. |
| 8,583,511 B2 | 11/2013 | Hendrickson |
| 8,671,009 B1 | 3/2014 | Coley et al. |
| 8,744,968 B1 | 6/2014 | Grigg et al. |
| 8,811,892 B2 | 8/2014 | Khan et al. |
| 8,818,858 B1 | 8/2014 | Parimi et al. |
| 9,058,597 B2 | 6/2015 | DeLuca et al. |
| 9,712,671 B2 | 7/2017 | Monegan et al. |
| 10,152,680 B1 | 12/2018 | Myrick et al. |
| 10,395,186 B1 | 8/2019 | McCullough et al. |
| 10,726,393 B2* | 7/2020 | Kaufman ........... G06Q 10/1095 |
| 10,733,595 B2 | 8/2020 | Myrick et al. |
| 2002/0002478 A1 | 1/2002 | Swart et al. |
| 2002/0072974 A1 | 6/2002 | Pugliese, III et al. |
| 2002/0111856 A1 | 8/2002 | Messer et al. |
| 2003/0189498 A1 | 10/2003 | Kakihara et al. |
| 2003/0220835 A1 | 11/2003 | Barnes, Jr. |
| 2004/0034537 A1 | 2/2004 | Gengarella et al. |
| 2004/0077347 A1 | 4/2004 | Lauber et al. |
| 2004/0199412 A1 | 10/2004 | McCauley |
| 2004/0243430 A1 | 12/2004 | Horstemeyer |
| 2005/0080675 A1 | 4/2005 | Lovegreen et al. |
| 2005/0102154 A1 | 5/2005 | Dodd et al. |
| 2005/0108116 A1 | 5/2005 | Dobson et al. |
| 2005/0119937 A1 | 6/2005 | Estes |
| 2005/0267787 A1 | 12/2005 | Rose et al. |
| 2006/0047537 A1 | 3/2006 | Brimdyr |
| 2006/0095434 A1 | 5/2006 | McCullough et al. |
| 2006/0242154 A1 | 10/2006 | Rawat et al. |
| 2007/0083403 A1 | 4/2007 | Baldwin et al. |
| 2007/0162308 A1 | 7/2007 | Peters |
| 2007/0255586 A1 | 11/2007 | Green et al. |
| 2007/0274495 A1 | 11/2007 | Youd et al. |
| 2008/0052110 A1 | 2/2008 | Ruggirello et al. |
| 2008/0154654 A1 | 6/2008 | Niessen et al. |
| 2008/0195428 A1 | 8/2008 | O'Sullivan |
| 2008/0284562 A1 | 11/2008 | Arthurs et al. |
| 2008/0306781 A1 | 12/2008 | Gerlach et al. |
| 2009/0055208 A1 | 2/2009 | Kaiser |
| 2009/0172035 A1 | 7/2009 | Lessing et al. |
| 2009/0325606 A1 | 12/2009 | Farris |
| 2010/0004989 A1 | 1/2010 | Bonalle et al. |
| 2010/0015993 A1 | 1/2010 | Dingler et al. |
| 2010/0191552 A1 | 7/2010 | Behrens et al. |
| 2010/0293029 A1 | 11/2010 | Olliphant |
| 2010/0293065 A1 | 11/2010 | Brody et al. |
| 2011/0022424 A1 | 1/2011 | VonDerheide |
| 2011/0099116 A1 | 4/2011 | Gabel |
| 2011/0137692 A1 | 6/2011 | Sethna |
| 2011/0191122 A1 | 8/2011 | Kharraz Tavakol et al. |
| 2011/0191184 A1 | 8/2011 | Blackhurst et al. |
| 2011/0215933 A1 | 9/2011 | Darling, IV et al. |
| 2011/0246247 A1 | 10/2011 | McCullough et al. |
| 2011/0251881 A1 | 10/2011 | Maine |
| 2011/0313806 A1 | 12/2011 | Huang |
| 2011/0313867 A9 | 12/2011 | Silver |
| 2011/0314115 A1 | 12/2011 | Nagaraj |
| 2012/0016745 A1 | 1/2012 | Hendrickson |
| 2012/0072274 A1 | 3/2012 | King |
| 2012/0143753 A1 | 6/2012 | Gonzalez et al. |
| 2012/0166332 A1 | 6/2012 | Naaman |
| 2012/0173350 A1 | 7/2012 | Robson |
| 2012/0173396 A1 | 7/2012 | Melby et al. |
| 2012/0191551 A1 | 7/2012 | Lutnick et al. |
| 2012/0197670 A1 | 8/2012 | Poon |
| 2012/0203619 A1 | 8/2012 | Lutnick et al. |
| 2012/0209672 A1 | 8/2012 | Winner et al. |
| 2012/0215855 A1 | 8/2012 | Goodman et al. |
| 2012/0239504 A1 | 9/2012 | Curlander et al. |
| 2012/0265585 A1 | 10/2012 | Muirbrook et al. |
| 2012/0278165 A1 | 11/2012 | Mercuri et al. |
| 2012/0296680 A1 | 11/2012 | Jantz et al. |
| 2012/0323789 A1 | 12/2012 | Salonen |
| 2013/0013350 A1 | 1/2013 | McCullough et al. |
| 2013/0030965 A1 | 1/2013 | Nuzzi et al. |
| 2013/0046626 A1 | 2/2013 | Grigg et al. |
| 2013/0046635 A1* | 2/2013 | Grigg ................. G06Q 30/0238 |
| | | 705/14.58 |
| 2013/0060591 A1 | 3/2013 | Meegan |
| 2013/0080239 A1 | 3/2013 | Okerlund |
| 2013/0090959 A1 | 4/2013 | Kvamme et al. |
| 2013/0090963 A1* | 4/2013 | Sharma ........... G06Q 10/06311 |
| | | 705/7.13 |
| 2013/0144660 A1 | 6/2013 | Martin |
| 2013/0179348 A1 | 7/2013 | Crofts et al. |
| 2013/0185125 A1 | 7/2013 | Celorio-Martinez et al. |
| 2013/0210461 A1 | 8/2013 | Moldaysky et al. |
| 2013/0218780 A1* | 8/2013 | Buzz ...................... G06Q 10/06 |
| | | 705/301 |
| 2013/0262307 A1 | 10/2013 | Fasoli et al. |
| 2013/0282412 A1 | 10/2013 | Dingler et al. |
| 2013/0325526 A1 | 12/2013 | Tyler |
| 2013/0332207 A1 | 12/2013 | Brunel et al. |
| 2013/0332208 A1 | 12/2013 | Mehta |
| 2013/0332255 A1 | 12/2013 | Carlson et al. |
| 2013/0332509 A1 | 12/2013 | Schwartz et al. |
| 2014/0012688 A1 | 1/2014 | McGuinness et al. |
| 2014/0025524 A1 | 1/2014 | Sims et al. |
| 2014/0039999 A1 | 2/2014 | Levene et al. |
| 2014/0046845 A1 | 2/2014 | Dogin et al. |
| 2014/0052516 A1 | 2/2014 | Beighley, Jr. |
| 2014/0085109 A1 | 3/2014 | Stefik et al. |
| 2014/0089956 A1 | 3/2014 | Shah et al. |
| 2014/0095232 A1 | 4/2014 | Shiva et al. |
| 2014/0095239 A1 | 4/2014 | Mansfield et al. |
| 2014/0136259 A1 | 5/2014 | Kinsey, II et al. |
| 2014/0136443 A1 | 5/2014 | Kinsey et al. |
| 2014/0156410 A1 | 6/2014 | Wuersch et al. |
| 2014/0156517 A1 | 6/2014 | Argue et al. |
| 2014/0188509 A1 | 7/2014 | Palestrant et al. |
| 2014/0188703 A1 | 7/2014 | Tse et al. |
| 2014/0207509 A1* | 7/2014 | Yu .................... G06Q 10/1095 |
| | | 705/7.19 |
| 2014/0244324 A1 | 8/2014 | Ford et al. |
| 2014/0278671 A1 | 9/2014 | Leonhardt et al. |
| 2014/0278679 A1 | 9/2014 | Navani et al. |
| 2014/0279420 A1 | 9/2014 | Okerlund et al. |
| 2014/0316835 A1* | 10/2014 | Cortes ............... G06Q 10/1095 |
| | | 705/7.19 |
| 2014/0343977 A1 | 11/2014 | Macina |
| 2014/0351032 A1 | 11/2014 | Cockburn et al. |
| 2015/0006221 A1 | 1/2015 | Mermelstein |
| 2015/0039357 A1 | 2/2015 | Segal et al. |
| 2015/0046271 A1 | 2/2015 | Scholl et al. |
| 2015/0046296 A1 | 2/2015 | Hart |
| 2015/0120344 A1 | 4/2015 | Rose |
| 2015/0120453 A1 | 4/2015 | Lee et al. |
| 2015/0120504 A1 | 4/2015 | Todasco |
| 2015/0149542 A1 | 5/2015 | Jain et al. |
| 2015/0235183 A1 | 8/2015 | Sampson et al. |
| 2015/0235268 A1 | 8/2015 | Bell et al. |
| 2015/0242764 A1 | 8/2015 | Subbaraj |
| 2016/0117612 A1 | 4/2016 | Hong et al. |
| 2016/0148163 A1 | 5/2016 | Beaumont et al. |
| 2016/0267439 A1 | 9/2016 | Bitran et al. |
| 2016/0328681 A1 | 11/2016 | Portnoy et al. |
| 2016/0335686 A1 | 11/2016 | Athuluru Tlrumala et al. |
| 2016/0350720 A1 | 12/2016 | Moorjani et al. |
| 2017/0352006 A1 | 12/2017 | Yu et al. |
| 2018/0150825 A1 | 5/2018 | Myrick et al. |

(56) References Cited

U.S. PATENT DOCUMENTS

2019/0303972 A1 10/2019 Myrick et al.
2020/0387886 A1 12/2020 Myrick et al.

FOREIGN PATENT DOCUMENTS

WO 2014/078672 A2 5/2014
WO 2016/049555 A1 3/2016

OTHER PUBLICATIONS

Examiner Requisition for Canadian Patent Application No. 2,959,547, mailed Nov. 23, 2018.
Final Office Action dated Dec. 31, 2018, for U.S. Appl. No. 14/498,789, of Myrick, L., et al., filed Sep. 26, 2014.
Final Office Action dated Jan. 2, 2019, for U.S. Appl. No. 14/498,782, of Myrick, L., et al., filed Sep. 26, 2014.
Final Office Action dated Jan. 28, 2019, for U.S. Appl. No. 14/224,804, of Rose, C., filed Mar. 25, 2014.
Final Office Action dated Sep. 1, 2015 for U.S. Appl. No. 14/498,632, of Myrick, L., et al., filed Sep. 26, 2014.
Third Office Action for Canadian Patent Application No. 2,959,547, dated Nov. 7, 2019.
Final Office Action dated Mar. 26, 2019, for U.S. Appl. No. 14/735,877, of Ave, W. et al., filed Jun. 10, 2015.
Non Final Office Action dated Jun. 13, 2019, for U.S. Appl. No. 14/224,804, of Rose, C., filed Mar. 25, 2014.
Advisory Action dated Jun. 20, 2019, for U.S. Appl. No. 14/735,877, of Ave, W. et al., filed Jun. 10, 2015.
Final Office Action dated Apr. 26, 2018, for U.S. Appl. No. 14/498,782, of Myrick, L., et al., filed Sep. 26, 2014.
Final Office Action dated Jun. 11, 2018, for U.S. Appl. No. 14/735,877, of Ave, W., et al., filed Jun. 10, 2015.
Advisory Action dated Jun. 23, 2017, for U.S. Appl. No. 14/498,632, of Myrick, L., et al., filed Sep. 26, 2014.
Final Office Action dated Oct. 26, 2017, for U.S. Appl. No. 14/498,755, of Myrick, L., et al., filed Sep. 26, 2014.
Examination Report No. 1 for Australian Patent Application No. 2015320316, dated Nov. 8, 2017.
Examiner's Requisition for Canadian Patent Application, mailed Dec. 7, 2017.
Non-Final Office Action dated Dec. 20, 2017, for U.S. Appl. No. 14/735,877, of Ave, W., et al., filed Jun. 10, 2015.
International Search Report and Written Opinion for PCT Application No. PCT/US2015/052406 dated Nov. 4, 2015.
Non-Final Office Action dated Jul. 1, 2016 for U.S. Appl. No. 14/498,632, of Myrick, L., et al., filed Sep. 26, 2014.
Non Final Office Action dated Jul. 26, 2019, for U.S. Appl. No. 14/735,877, of Ave, W., et al., filed Jun. 10, 2015.
Non-Final Office Action dated Oct. 30, 2019, for U.S. Appl. No. 15/868,655, of Myrick, I.A., et al., filed Jan. 11, 2018.
Final Office Action dated Dec. 19, 2019, for U.S. Appl. No. 14/735,877, of Ave, W., et al., filed Jun. 10, 2015.
Final Office Action dated Dec. 27, 2019, for U.S. Appl. No. 14/224,804, of Rose, C., filed Mar. 25, 2014.
Notice of Allowance dated Sep. 13, 2017, for U.S. Appl. No. 14/498,632, of Myrick, L., et al., filed Sep. 26, 2014.
Non-Final Office Action dated Oct. 5, 2017, for U.S. Appl. No. 14/498,782, of Myrick, L., et al., filed Sep. 26, 2014.
Non-Final Office Action dated Oct. 5, 2017, for U.S. Appl. No. 14/498,789, of Myrick, L, et al., filed Sep. 26, 2014.
Final Office Action dated Apr. 14, 2017, for U.S. Appl. No. 14/498,632, of Myrick, L., et al., filed Sep. 26, 2014.

Non-Final Office Action dated Apr. 17, 2017, for U.S. Appl. No. 14/498,755, of Myrick, L., et al., filed Sep. 26, 2014.
Non-Final Office Action dated Dec. 20, 2016, for U.S. Appl. No. 14/224,804, of Rose, C., filed Mar. 25, 2014.
Final Office Action dated Aug. 11, 2017, for U.S. Appl. No. 14/224,804, of Rose, C., filed Mar. 25, 2014.
Non-Final Office Action dated Mar. 2, 2018, for U.S. Appl. No. 14/498,755, of Myrick, L., et al., filed Sep. 26, 2014.
Final Office Action dated Mar. 29, 2018, for U.S. Appl. No. 14/498,789, of Myrick, L., et al., filed Sep. 26, 2014.
U.S. Appl. No. 14/498,632, of Myrick, L., et al., filed Sep. 26, 2014.
U.S. Appl. No. 14/498,755, of Myrick, L., et al., filed Sep. 26, 2014.
U.S. Appl. No. 14/498,782, of Myrick, L., et al., filed Sep. 26, 2014.
U.S. Appl. No. 14/498,789, of Myrick, L., et al., filed Sep. 26, 2014.
U.S. Appl. No. 14/735,877, of Ave, W., et al., filed Jun. 10, 2015.
Restriction Requirement dated Feb. 12, 2015 for U.S. Appl. No. 14/498,632, of Myrick, L., et al., filed Sep. 26, 2014.
Non-Final Office Action dated May 7, 2015 for U.S. Appl. No. 14/498,632, of Myrick, L., et al., filed Sep. 26, 2014.
Buttle, F.A., "Word of mouth: understanding and managing referral marketing," Journal of Strategic Marketing, vol. 6, Issue 3, pp. 241-254 (1998).
Weaver, P., "A Brief History of Scheduling—Back to the Future," Mosaic Project Services Pty Ltd, pp. 1-24 (Apr. 4-6, 2006).
Weaver, P., "A Brief History of Scheduling" Retrieved from the Internet URL: https://mosaicprojects.com.au/Resources_Papers_042.html, pp. 1-2 (2006).
Non-Final Office Action dated Jun. 28, 2018, for U.S. Appl. No. 14/498,789, of Myrick, L., et al., filed Sep. 26, 2014.
Non-Final Office Action dated Jul. 2, 2018, for U.S. Appl. No. 14/224,804, of Rose, C., filed Mar. 25, 2014.
Notice of Allowance dated Jul. 18, 2018, for U.S. Appl. No. 14/498,755, of Myrick, L., et al., filed Sep. 26, 2014.
Non-Final Office Action dated Aug. 27, 2018, for U.S. Appl. No. 14/498,782, of Myrick, L., et al., filed Sep. 26, 2014.
Advisory Action dated Oct. 9, 2018, for U.S. Appl. No. 14/735,877, of Ave, W., et al., filed Jun. 10, 2015.
Examination Report No. 2 for Australian Patent Application No. 2015320316, dated Nov. 7, 2018.
Non-Final Office Action dated Nov. 9, 2018, for U.S. Appl. No. 14/735,877, of Ave, W., et al., filed Jun. 10, 2015.
Examination Report No. 2 for AU Application No. 2018260870 dated Oct. 26, 2020.
Notice of Allowance for Canadian Patent Application No. 2,959,547, dated Jul. 14, 2020.
Notice of Allowance dated Mar. 25, 2020, for U.S. Appl. No. 15/868,655, of Myrick, L.A., et al., filed Jan. 11, 2018.
Examination Report No. 1 for AU Application No. 2018260870 dated Feb. 26, 2020.
Gervasio, M.T., et al. "Active Preference Learning for Personalized Calendar Scheduling Assistance", San Diego, California, Jan. 9-12, 2005, pp. 1-8.
Non-Final Office Action dated Sep. 22, 2020, for U.S. Appl. No. 16/446,536, of Myrick, L.A., et al., filed Jun. 19, 2019.
Non-Final Office Action dated Sep. 4, 2020, for U.S. Appl. No. 16/589,076, of Rose, C., filed Sep. 30, 2019.
Busemann, S., "Automating NL Appointment Scheduling with Cosma", DFKI GmbH, pp. 5-6 (Year:1997).
Notice of Allowance dated Jan. 22, 2021, for U.S. Appl. No. 16/446,536, of Myrick, L.A., et al., filed Jun. 19, 2019.
Examination Report No. 3 for Australian Application No. 2018260870 dated Feb. 24, 2021.
Non-Final Office Action dated Mar. 10, 2021, for U.S. Appl. No. 16/589,076, of Rose C. et al., filed Sep. 30, 2019.

* cited by examiner

CONSOLIDATION OF CALENDAR APPOINTMENTS

BACKGROUND

Merchants often interact with calendars to schedule appointments with customers for items or services that are offered by the merchants. In some instances, a merchant may schedule an appointment with a customer during a time when the merchant prefers to be working or is otherwise available. For example, the merchant may schedule appointments only on Mondays, Wednesdays, and Fridays in order to be free Tuesdays and Thursdays. Additionally, customers may schedule appointments at various times throughout a day, week, month, etc. This can result in a merchant having multiple time slots available between scheduled appointments, requiring the merchant to be open when relatively few appointments are scheduled.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
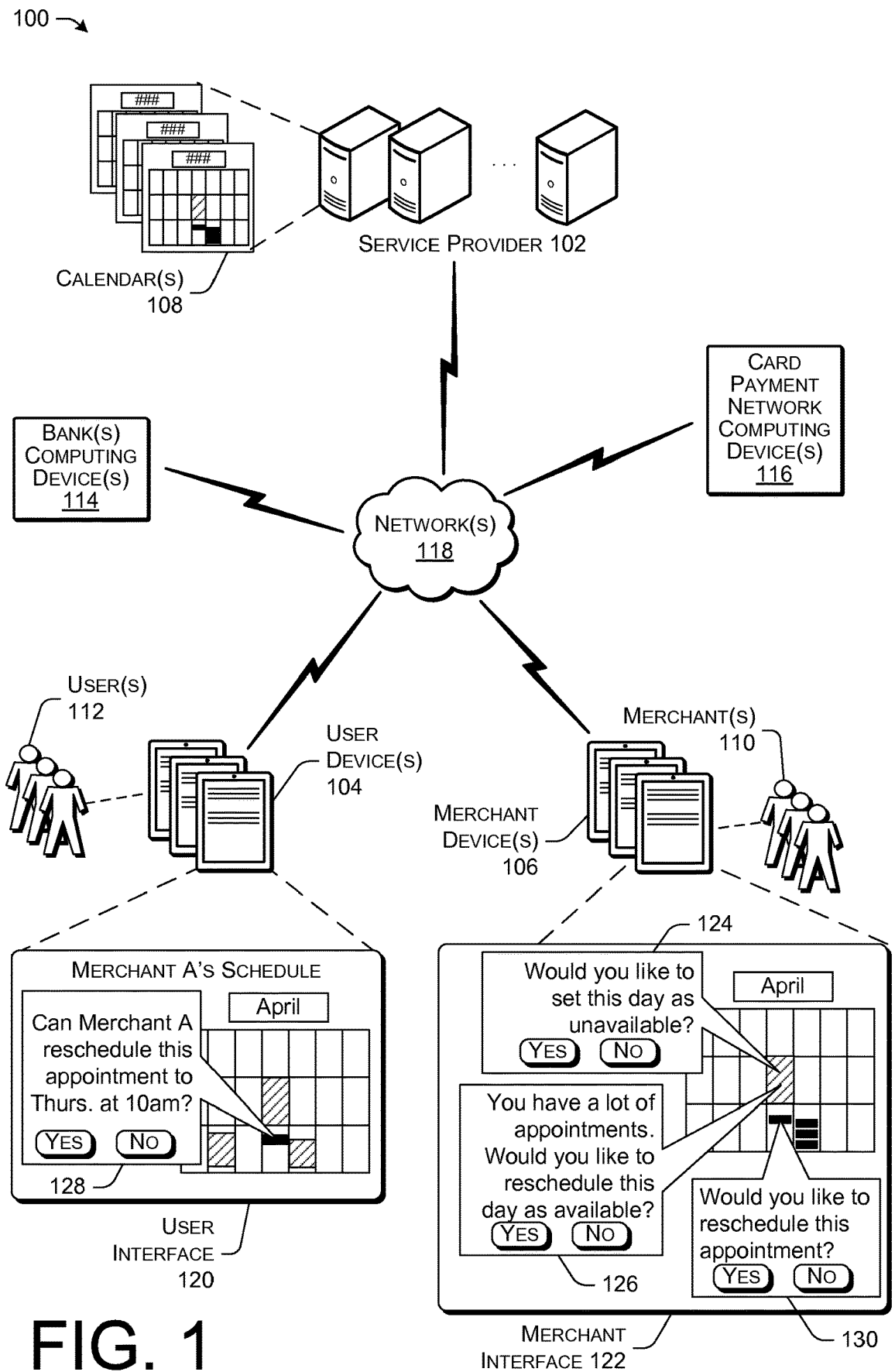
FIG. 1 illustrates an example architecture for processing calendar availability and consolidating appointments.

Merchants often spend relatively large amounts of time scheduling appointments and end-up with schedules that have appointments booked at sporadic times throughout a day, week, month, etc.

This disclosure describes techniques for processing calendar availability and consolidating appointments. In some implementations, the techniques may monitor scheduling interactions of a merchant with a calendar to schedule a merchant as unavailable in the calendar at a particular time and/or to reschedule the merchant as available at a time that is designated as unavailable. By scheduling a merchant as unavailable, customers may be encouraged to schedule appointments at times that are preferred by the merchant. Additionally, or alternatively, the techniques may consolidate a merchant's schedule by rescheduling appointments when particular criteria are satisfied. This may provide the merchant with larger blocks of time during which the merchant is free and/or with more condensed blocks of time during which appointments are scheduled. Further, the techniques may include other features to manage a calendar and/or enhance a merchant's experience in scheduling appointments.

As one example of processing calendar availability, a service provider may monitor interactions of a merchant with a calendar to schedule a merchant as unavailable in the calendar. In doing so, the service provider may generally identify a period of time that the merchant prefers to be free from appointments with customers and send a notification to the merchant suggesting that the calendar be scheduled as unavailable during the period of time. To illustrate, the service provider may determine that a merchant has blocked out Mondays from 12-5 PM as unavailable in the calendar more than a threshold number of times over the past three months, since the merchant prefers to not work during this period of time (e.g., for personal, business, or other reasons). Accordingly, the service provider may send a notification to the merchant suggesting that the calendar be set as unavailable on Mondays from 12-5 PM. The notification may be provided through an interface (e.g., an alert on a calendar interface), a message (e.g., text message, email, telephone call, etc.), or otherwise. The notification may be sent based on when the merchant blocks out Mondays. For instance, if the merchant generally blocks out Mondays the preceding Thursday, the notification may be sent on Thursday. Upon receiving the notification, the merchant may provide input and, if the input so requests, the service provider may schedule the merchant as unavailable on Monday from 12-5 PM. This may encourage customers to schedule appointments for other time slots that are more preferred by the merchant.

Additionally, or alternatively, the service provider may reschedule a merchant as available for a period of time that has been previously set as unavailable in order to potentially obtain additional appointments with customers. The service provider may generally provide a notification regarding confirmation or cancellation of the unavailability of the merchant when a particular number of appointments are scheduled over a window of time before and/or after the period of time. The notification may be provided a number of hours, days, weeks, etc. in advance of the period of time that is set as unavailable. In returning to the illustration above where the merchant is set as unavailable on a particular Monday from 12-5 PM, the service provider may determine if there are more than a threshold number of appointments scheduled over a window of time from the Thursday prior to the Tuesday following. If more than the threshold number of appointments are scheduled (e.g., indicating that the merchant's schedule is relatively full), the service provider may send a notification to the merchant to ask if the merchant would still like to be scheduled as unavailable on Monday from 12-5 PM. The merchant may provide input and, if the input so requests, the service provider may reschedule the merchant as available on Monday from 12-5 PM. This may open additional time slots for scheduling appointments with customers to potentially increase the number of scheduled appointments for the merchant, thereby increasing revenue for the merchant.

As one example of consolidating appointments, the service provider may seek to reschedule appointments when one or more criteria are satisfied in order to condense appointments within a calendar. The service provider may generally seek to reschedule an appointment to a period of time that is associated with a relatively high number of appointments and/or from a period of time that is associated with a relatively low number of appointments. To illustrate, the service provider may determine to reschedule a Thursday appointment to Friday when less than a threshold number of appointments are scheduled for Thursday and/or when more than the threshold number of appointments are scheduled for Friday. In another illustration, it may be determined to reschedule an appointment on Monday (which has relatively few appointments) to a time slot that has just opened up on Tuesday (which has relatively many appointments) due to a cancellation (or rescheduling) of an appointment for the time slot on Tuesday. Additionally, or alternatively, the service provider may account for locations of appointments, hours of operation of a merchant's business, employees' schedules, and a variety of other information. In one illustration, it may be determined to reschedule an appointment from Wednesday (which may have relatively few appointments) to Saturday (which may have relatively many scheduled appointments) when a location of the Wednesday appointment is within a predetermined proximity to a location of the Saturday appointment. In a further illustration, it may be determined to reschedule an appointment from a Saturday (a day when the merchant is generally not open for business) to a Tuesday (when the merchant is normally open for business and/or a particular number of employees will be working).

Upon determining to reschedule an appointment, the service provider may send a notification to a customer of the appointment to request that the appointment be rescheduled. In some instances, the notification may suggest a new time slot for the appointment, while in other instances the notification may merely request that the appointment be rescheduled. The customer may provide input and, if requested in the input, the service provider may reschedule the appointment to another time slot. The service provider may then provide a notification to the merchant indicating that the appointment has been rescheduled. By rescheduling appointments, a merchant may obtain a more condensed calendar (e.g., appointments are scheduled more closely within a window of time).

The calendar availability processing and/or appointment consolidation techniques discussed herein may be performed at various times to intelligently manage a merchant's calendar. In one example, if a particular Monday is less than three days away, and no appointments have been scheduled for that day, the service provider may suggest that the merchant be scheduled as unavailable on Monday. In another example, if a scheduled appointment is less than three days away, and there is only one appointment scheduled for that day, the service provider may send a notification to request that the appointment be rescheduled to free-up that day for the merchant.

Although the examples above describe various techniques that provide notifications and receive input, in some examples the techniques may be performed automatically without providing notifications and/or receiving input.

This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 illustrates an example architecture 100 for processing calendar availability and consolidating appointments. The architecture 100 includes a service provider 102 that communicates with one or more users devices 104 (hereinafter "the user device 104") and one or more merchant devices 106 (hereinafter "the merchant device 106") to manage one or more calendars 108 for one or more merchants 110 (hereinafter "the merchant 110") that are associated with the merchant device 106. As such, the service provider 102 may manage a schedule of appointments for the merchant 110. The merchant 110 may be any individual, entity, or machine that offers services, including an employee of a merchant or another user that is affiliated with the merchant. The user device 104 may be employed by one or more users 112 (hereinafter "the user 112"). The service provider 102 may, in some instances, facilitate transactions between the user 112 and the merchant 110, which may include communicating with one or more bank computing devices 114 and one or more card payment network computing devices 116. As illustrated, the service provider 102, the user device 104, the merchant device 106, the one or more bank computing devices 114, and/or the one or more card payment network computing devices 116 may communicate with each other via one or more networks 118.

The service provider 102 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

Figure 2:
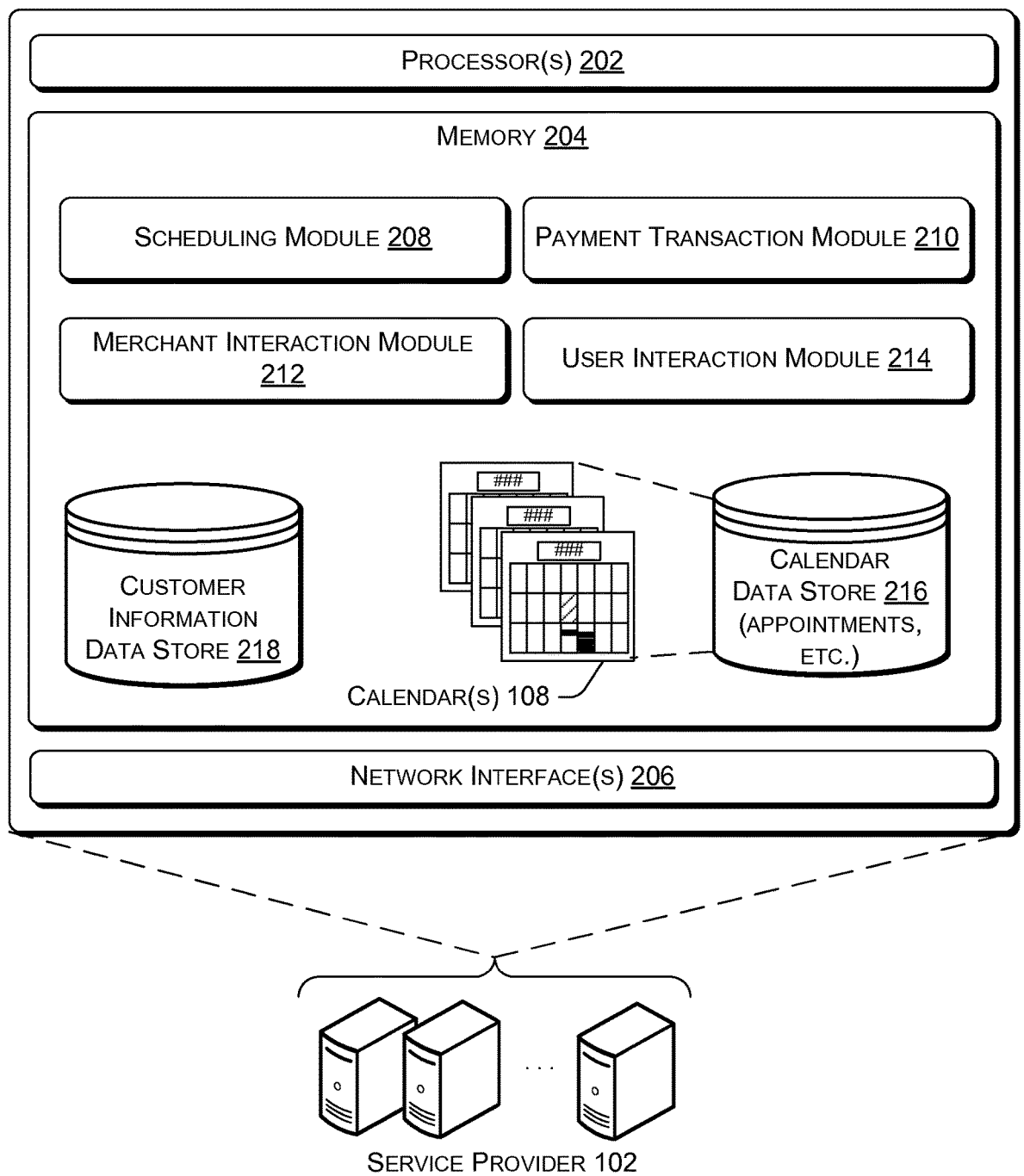
FIG. 2 illustrates example details of a service provider.

While FIG. 1, and FIG. 2, illustrates components and data of the service provider 102 as being present in a single location, these components and data may alternatively be distributed across different computing devices and/or different locations in any manner. Consequently, the functions may be implemented by one or more computing devices, with the various functionality described being distributed in various ways across the different computing devices. Multiple computing devices may be located together or separately, and organized, for example, as virtual servers, server banks, and/or server farms. The described functionality may be provided by the servers of a single entity or enterprise, or may be provided by the servers and/or services of multiple different buyers or enterprises.

The service provider 102 may generally manage the one or more calendars 108. Each of the one or more calendars 108 may be associated with a respective merchant 110 via an account or otherwise, such as an account managed by the service provider 102. The one or more calendars 108 may include appointments with customers, appointments for meetings (e.g., internal to the merchant 110 or external), appointments for personal or business events, time periods that are blocked out as unavailable, or any other item that may be relevant to a schedule for the merchant 110. The appointments or other items in the one or more calendars 108 may include a variety of information, such as an identity of a customer, a time slot for the appointment, background information for a customer (e.g., preferences, transaction history with a merchant, etc.), an item being offered for acquisition for an appointment, and so on. In some instances, the one or more calendars 108 are made available to both customers and merchants. In other instances, the one or more calendars 108 are made available exclusively to merchants or customers. In the example of FIG. 1, the one or more calendars 108 may be made available to the user 112 via a user interface 120 and made available to the merchant 110 via a merchant interface 122. The user interface 120 and/or the merchant interface 122 may be provided via a web browser, an application (e.g., mobile application, desktop application, etc.), or otherwise. The user 112 may be provided with access to different information than that made available to the merchant 110.

The service provider 102 may monitor usage of the one or more calendars 108. For example, the service provider 102 may monitor scheduling interactions of the merchant 110 to determine appointments that are added, removed, rescheduled, and/or updated, and when the additions, removals, rescheduling, and/or updates occur. From the monitoring, the service provider 102 may additionally, or alternatively, determine periods of time are blocked out as being unavailable, when those periods of time are blocked out, when those periods of time are removed (e.g., rescheduled as available), and so on. Further, the service provider 102 may identify any other interaction with the one or more calendars 108.

As one example, the service provider 102 may identify a period of time that is scheduled in the one or more calendars 108 as being unavailable for appointments with customers. For instance, the service provider 102 may detect that the merchant 110 has blocked out Wednesdays, more than a predetermined number of times, as being unavailable for appointments. The service provider 102 may then provide a notification to the merchant 110 suggesting that the merchant 110 be scheduled as unavailable for the period of time (e.g., Wednesday). The notification may be provided a particular number of hours, days, weeks, months, etc. in advance of the period of time (e.g., provide the notification on Friday regarding the following Wednesday). The notification may be provided to the merchant 110 in various manners, such as via an email, text message, telephone call, post, message on a social networking site, message on an interface, etc. In the example of FIG. 1, the service provider 102 provides the notification via a pop-up window 124 in the merchant interface 122. The pop-up window 124 asks the merchant 110 "Would you like to set this day as unavailable?" The merchant 110 may select a "Yes" or "No" button to indicate whether he would like to set the particular day as unavailable. Here, the merchant 110 has selected the "Yes" button and a particular day is set as unavailable.

Thereafter, the service provider 110 may provide another notification, when the period of time that is designated is unavailable approaches, to find out if the merchant would still like to maintain the period of time as unavailable. In the example of FIG. 1, the service provider 110 determines that the merchant's schedule is relatively full (e.g., more than a threshold number of appointments are scheduled) over a window of time before and/or after the period of time (e.g., a number of days before or after the period of time). Thus, the service provider 102 presents a pop-up window 126 asking "You have a lot of appointments. Would you like to reschedule this day as available?" The merchant 112 may confirm or cancel the designation as unavailable by selecting a "Yes" or "No" button. In response to selecting the "Yes" button, the merchant 112 is rescheduled as being available. In response to selecting the "No" button, the period of time is maintained as being unavailable.

The service provider 102 may also consolidate a schedule for the merchant 110 by causing an appointment to be rescheduled. The schedule consolidation may be based on a number of appointments that are scheduled for a period of time. As noted above, the service provider 102 may generally seek to reschedule an appointment to a period of time that is associated with a relatively high number of appointments and/or from a period of time that is associated with a relatively low number of appointments. In one example, assume that the merchant 110 has four time slots available on Monday and four time slots available on Tuesday. Assume also that only one time slot is filled with an appointment on Monday and all four time slots are filled with appointments on Tuesday. If the service provider 102 detects that one of the time slots for Tuesday cancels, leaving an open time slot, and detects the appointment on Monday as the only scheduled appointment for that day, the service provider 102 may send a notification to a customer of the Monday appointment requesting to reschedule the appointment to Tuesday (or at least to another day). This may free-up Monday for the merchant 110 and fill an open time slot for Tuesday. The notification may be provided to the customer in various manners, such as via an email, text message, telephone call, post, message on a social networking site, message on an interface, etc. In the example of FIG. 1, the service provider 102 provides the notification via a pop-up window 128 in the user interface 120. The pop-up window 128 asks "Can Merchant A reschedule this appointment to Thursday at 10 AM?" In response to selecting the "Yes" button, the service provider 102 may reschedule the appointment. In response to selecting the "No" button, the service provider 102 may refrain from rescheduling the appointment.

In some instances, as illustrated in the example of FIG. 1, the service provider 102 may provide a notification to the merchant 110 before requesting that the appointment be rescheduled. As illustrated, the service provider 102 may provide a pop-up window 130 asking the merchant 110 "Would you like to reschedule this appointment?" The pop-up window 130 may identify the particular appointment to be reschedule and may include additional information, such as the reason for determining to reschedule the appointment (e.g., appointment canceled, more appointments scheduled for another day, not enough appointments scheduled for that day, etc.). In response to selecting the "Yes" button, the service provider 102 may contact the user 112 to request that the appointment be rescheduled. In response to selecting the "No" button, the service provider 102 may maintain the appointment as scheduled.

Although the examples above include providing notifications (e.g., via the user interface 120 and/or the merchant interface 122) and receiving input, in some examples the techniques may be performed automatically without providing notifications and/or receiving input. For example, a merchant may be scheduled as unavailable as soon as the service provider 102 detects that the merchant has blocked out a particular period of time a threshold number of times. In another example, the service provider 102 may send a notification to a customer regarding rescheduling of an appointment automatically (without first seeking merchant approval) when predetermined thresholds are met, such as having less than a particular number of appointments scheduled on a day or having more than the particular number of appointments scheduled on another day.

The user device 104 and/or the merchant device 106 may comprise any type of computing device that is configured to perform an operation. For example, the user device 104 and/or the merchant device 106 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile, an appliance, a camera, a robot, a hologram system, a security system, a home-based computer system (e.g., intercom system, home media system, etc.), a projector, an automated teller machine (ATM), and so on. In some instances, the user device 104 and/or the merchant device 106 may be a mobile device.

As noted above, the service provider 102 may communicate with the one or more card payment network computing devices 116 to conduct a transaction electronically. The one or more card payment network computing devices 116 may be associated with a card payment network (e.g., MasterCard®, VISA®, etc.). The service provider 102 may also communicate with the one or more bank computing devices 114 of one or more banks. For example, the service provider 102 may communicate with an acquiring bank, an issuing bank, and/or a bank maintaining user accounts for electronic payments.

An acquiring bank may be a registered member of a card association (e.g., Visa®, MasterCard®, etc.), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, a user may use a debit card instead of a credit card, in which case, the bank computing device(s) of a bank corresponding to the debit card may receive communications regarding a transaction in which the user is participating. Additionally, there may be computing devices of other financial institutions involved in some types of transactions or in alternative system architectures, and thus, the foregoing are merely several examples for discussion purposes.

As noted above, the service provider 102, the user device 104, the merchant device 106, the one or more bank computing devices 114, and/or the one or more card payment network computing devices 116 may communicate via the one or more networks 118. The one or more networks 118 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 118 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, the service provider 102, the user device 104, the merchant device 106, the one or more bank computing devices 114, and/or the one or more card payment network computing devices 116 may communicatively couple to the one or more networks 118 in any manner, such as by a wired or wireless connection.

Although many techniques are described herein as being performed by a particular device, any number of the techniques may be performed by other devices. For example, techniques described as being performed by the service provider 102, may be performed locally at the user device 104, the merchant device 106, or another device.

FIG. 2 illustrates example details of the service provider 102 of FIG. 1. As noted above, the service provider 102 may be implemented as one or more computing devices. The one or more computing devices may include one or more processors 202, memory 204, and one or more network interfaces 206. The one or more processors 202 may include a central processing unit (CPU), a graphics processing unit (GPU), a microprocessor, a digital signal processor, and so on.

The memory 204 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc. As illustrated, the memory 204 may include a scheduling module 208, a payment transaction module 210, a merchant interaction module 212, and a user interface module 214.

The scheduling module 208 may manage the one or more calendars 108 stored in the calendar data store 216. This may include adding, removing, rescheduling, and/or updating appointments with customers, appointments for meetings, appointments for personal or business events, time periods that are blocked out as unavailable, or any other item that may be relevant to a schedule. The calendar data store 216 may additionally store information related to the one or more calendars 108, such as data about appointments (e.g., times of appointments, locations of appointments, customer information for the appointments, items being provided for the appointments, costs of items for appointments, preferences for the customers of the appointments, and so on). The scheduling module 208 may also monitor interactions of the merchant 110 and/or the user 112 regarding scheduling in the one or more calendars 108. In some instances, the scheduling module 208 may utilize information from a customer information data store 218 and/or the calendar data store 216 to handle of appointments. The customer information data store 218 may include information regarding electronic payment accounts of the customers (e.g., the user 112), customer transaction history (e.g., indicating transactions that have been conducted by the user 112), and so on. The scheduling module 208 may also seek to consolidate a merchant's schedule by rescheduling appointments.

The scheduling module 208 may operate in cooperation with the merchant interaction module 212 and the user interaction module 214 to handle communications with the merchant 110 and the user 112, respectively. In some instances, communications from the merchant 110 and the user 112 may be processed using a natural language processing techniques. The merchant interaction module 212 and the user interaction module 214 may operate to interface with the user device 104 and merchant device 106, respectively. For example, merchant interaction module 212 and the user interaction module 214 may operate in accordance with instructions from the scheduling module 208 to request or provide information on behalf of the scheduling module 208. The merchant interaction module 212 may send notifications to the merchant 110 regarding scheduling or rescheduling of appointments, unavailability of the merchant 110, and so on. Further, the user interaction module 214 may send notifications to the user 112 regarding scheduling or rescheduling of appointments (e.g., setting appointments, rescheduling appointments, and so on). In some instances, the merchant interaction module 212 may send data describing the merchant 110, such as a merchant name, geographic location, contact information, a calendar that describes appointments that are available for scheduling with the merchant, and so on. In some instances, the merchant interaction module 212 and the user interaction module 214 may facilitate a merchant interface (e.g., the merchant interface 122 of FIG. 1) and a user interface (e.g., the user interface 120 of FIG. 1), respectively.

The payment transaction module 210 may facilitate transactions between the merchant 110 and the user 112. During a transaction, the user 112 (e.g., customer) may acquire an item from the merchant 110 by purchasing, renting, leasing, borrowing, licensing, or the like. An item may refer to a good and/or a service offered by merchants. The payment transaction module 210 may be configured to enable electronic payments for transactions. The service provider 102 may include one or more computing devices that are configured to perform securely electronic financial transactions between the merchant 110 and the user 112 through, for example, data communicated between the user device 104 and the merchant device 106. Generally, when a user and a merchant enter into an electronic payment transaction, the transaction is processed by electronically transferring funds from a financial account associated with a user account for the user to a financial account associated with a merchant account for the merchant.

The payment transaction module 210 may often handle the processing of payments related to the appointments. When paying for a transaction, the user 112 can provide the amount of payment that is due to the merchant 110 using cash, check, a payment card, NFC, or by electronic payment. The merchant 110 may interact with the merchant device 106 to process the transaction at a point of sale (POS). The point of sale may be the place where the user 112 with the user device 104 meets the merchant 110 with the merchant device 106 at the appointment time. During the transaction, the merchant device 106 can determine and send data describing the transaction, including, for example, appointment data, services related to and/or provided as a part of the appointment, item(s) being purchased in connection with the appointment, the amount of the item(s), buyer information, and so forth.

In some implementations, the payment transaction module 210 enables card-less payments (e.g., electronic payments) for transactions between the user 112 and the merchant 110 based on interaction of the user 112 with the user device 104 and interaction of the merchant 110 with the merchant device 106. Accordingly, in some examples, a card-less payment transaction may include a transaction conducted at a POS location during which an electronic payment account of the user 112 is charged without the user 112 having to physically present a payment card to the merchant 110 at the POS location. Consequently, the merchant 110 need not receive any details about the financial account of the user 112 for the transaction to be processed. As one example, the electronic payment may be charged to a credit card issuer or credit card number that the user 112 provided when signing up with the service provider 102 for an electronic payment account. As another example, the user 112 may have a quantity of money pre-paid in an account maintained for use in making the electronic payments. Other variations will also be apparent to those of skill in the art having the benefit of the disclosure herein.

Figure 3:
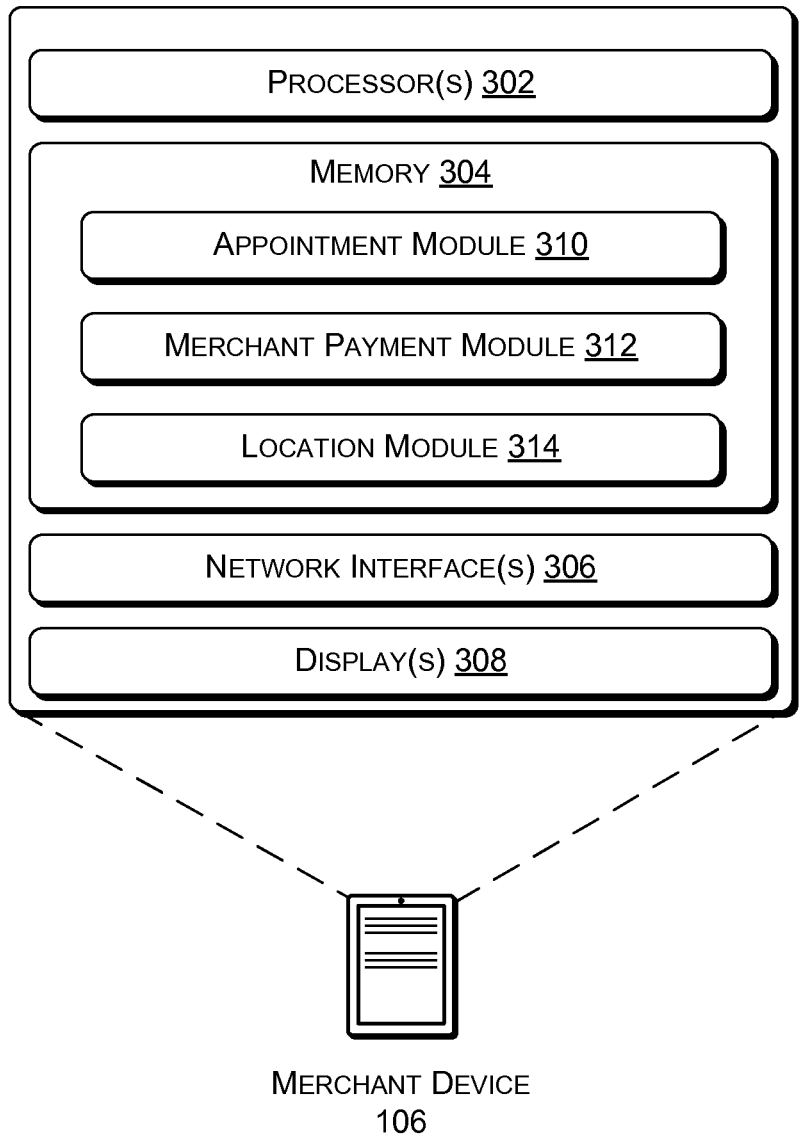
FIG. 3 illustrates example details of a merchant device.

FIG. 3 illustrates example details of the merchant device 106 of FIG. 1. As noted above, the merchant device 106 may be implemented as one or more computing devices. The one or more computing devices may include one or more processors 302, memory 304, one or more network interfaces 306, and one or more displays 308. The one or more processors 302 may include a central processing unit (CPU), a graphics processing unit (GPU), a microprocessor, a digital signal processor, and so on. The one or more displays 308 may include a touch screen, a Liquid-crystal Display (LCD), a Light-emitting Diode (LED) display, an organic LED display, a plasma display, an electronic paper display, or any other type of technology. Although not illustrated, the merchant device 106 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The merchant device 106 may additionally include, or be associated with, input device(s) such as a keyboard, a mouse, a pen, a voice input device, a touch input device, etc. The memory 304 may include an appointment module 310, a merchant payment module 312, and a location module 314.

The appointment module 310 may interface with the merchant 110 to manage a calendar associated with the merchant 110. For example, the appointment module 310 may display the calendar to the merchant 110 (e.g., via the merchant interface 122) to enable the merchant 110 to manage appointments (e.g., add, delete, reschedule, etc.), manage blocks of time that designated as unavailable, and so on. In some instances, the appointment module 310 may present appointments on the calendar different than blocks of time that are designated as unavailable. The appointment module 310 may provide customer information (records), such as contact information (e.g., identifying a customer, telephone number, email address, preferences for an item, etc.), to enable the merchant 110 to manage an appointment. For example, the merchant 110 may view a list of customers or potential customers, contact a particular customer on the list, and schedule an appointment in a calendar associated with the merchant 110. Thereafter, the merchant 110 may view the appointment and update any information as needed, such as rescheduling the appointments by sending a notification via the appointment module 310 to the customer, changing an item being requested for the appointment, changing a time of the appointments, and so on. The appointment module 310 may generally operate in cooperation with the service provider 102, such as the merchant interaction module 212.

In some instances, the appointment module 310 may enable the merchant 110 to set preferences for calendar management. Such preferences may include how many days in advance to send a notification suggesting to set a calendar as unavailable (e.g., send notification one week in advance of a time that is being suggested to be marked as unavailable), whether or not to be notified of setting a time slot as unavailable in the calendar (e.g., request merchant input vs.

automatically setting the time slot as unavailable), periods of time the merchant 110 desires to work (e.g., preference to work Monday-Wednesday), whether or not the merchant 110 wishes to be informed before a notification is sent to a customer to reschedule an appointment, and so on. The preferences may be stored locally at the merchant device 106 and/or remotely at the service provider 102. The preferences may be used by the scheduling module 208 and/or other modules of the service provider 102.

The merchant payment module 312 may perform various processes to assist the merchant 110 in processing transactions with customers, managing inventory, and so on. The merchant payment module 312 may provide various interfaces and/or dashboards. In one example, the merchant payment module 312 may facilitate transactions with customers by accepting payment from customers (e.g., via a card reader, NFC connection to a customer device, Bluetooth® connection to customer device, etc.), provide receipts for items (including printing receipts), receiving input from customers for items being acquired by the customers (e.g., confirmation, signature for credit card, etc.), and so on. In another example, the merchant payment module 312 may enable the merchant 110 to manage inventory by informing the merchant of inventory levels (e.g., number of items currently in-stock), order additional inventory, seek financing for inventory, and so on. In yet another example, the merchant payment module 312 may provide data analytics for sales, inventory, or other information. In some instances, an interface may be provided to a customer to facilitate a transaction, such as an interface to confirm payment, provide a signature, etc. The merchant payment module 312 may communicate with the service provider 102, such as the payment transaction module 210.

In some instances, the appointment module 310 and merchant payment module 312 may operate in cooperation. To illustrate, after an appointment with the user 112, the merchant 110 may view appointment information for the user 112 via a calendar interface provided by the appointment module 310. While viewing the appointment information, the merchant 110 may select a button or other interface icon to enable the merchant 110 to process a transaction with the user 112 for the appointment. In response to selecting the button or other interface icon, the merchant payment module 312 may provide a payment interface to enable the merchant 110 to process the transaction with the user 112 (e.g., purchase the item through a check-out process). Thereafter, upon completion of the transaction, the merchant payment module 312 may provide a button or other interface element to enable the merchant 110 to navigate back to the calendar interface. At the calendar interface (which is provided by the appointment module 310), the merchant 110 may schedule another appointment with the user 112. As such, the functionality may be transferred from one module to the other module. In some instances, the appointment module 310 and/or the merchant payment module 312 are implemented as separate mobile applications on the merchant device 106. Although this example discusses transferring functionality between the appointment module 310 and the merchant payment module 312, functionality may be transferred between any number of modules stored in the memory 304.

The location module 314 may determine a location of the merchant 110 (e.g., the merchant device 106). In some instances, the location is provided to the service provider 102, or used locally, to facilitate various functions, such as processing of transactions when a customer is located within a particular proximity to the merchant 110. The location module 314 may determine a geographic location of the merchant device 106 from geolocation techniques (e.g., satellite-based systems—global positioning system (GPS)), cell tower location data, wireless access point location data, wireless beacon location, and so forth.

Figure 4:
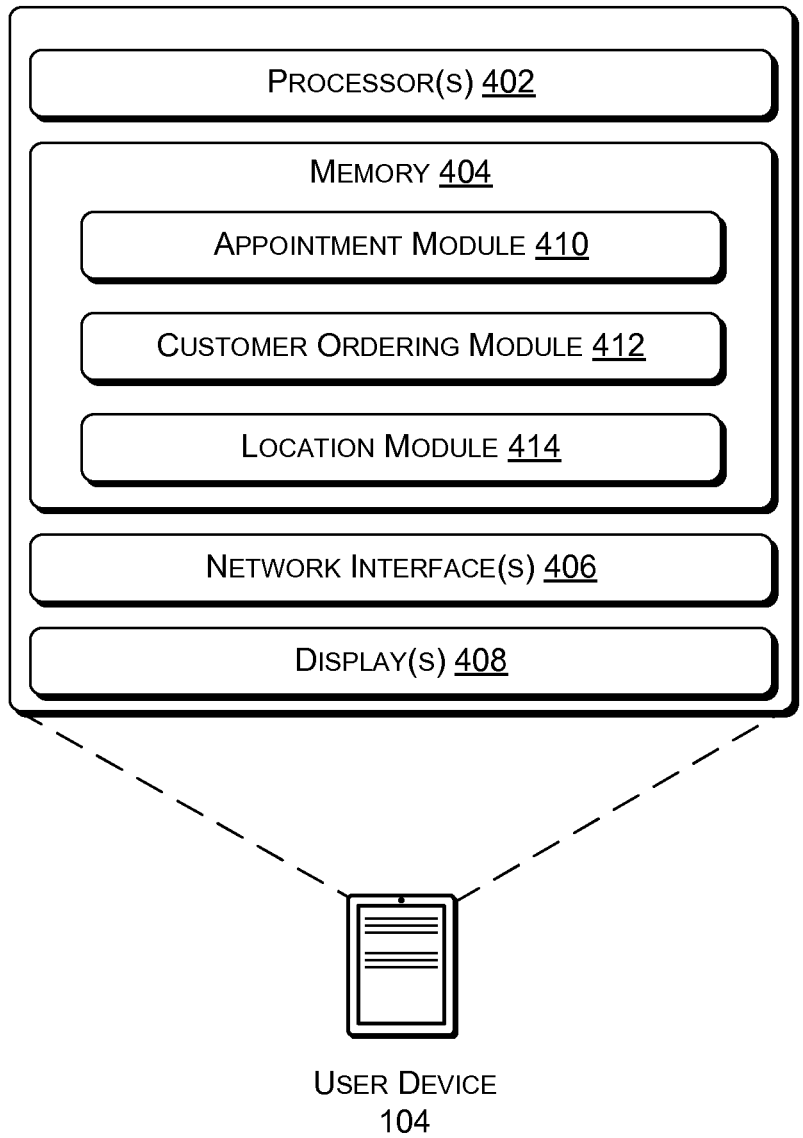
FIG. 4 illustrates example details of a user device.

FIG. 4 illustrates example details of the user device 104 of FIG. 1. As noted above, the user device 104 may be implemented as one or more computing devices. The one or more computing devices may include one or more processors 402, memory 404, one or more network interfaces 406, and one or more displays 408. The one or more processors 402 may include a central processing unit (CPU), a graphics processing unit (GPU), a microprocessor, a digital signal processor, and so on. The one or more displays 408 may include a touch screen, a Liquid-crystal Display (LCD), a Light-emitting Diode (LED) display, an organic LED display, a plasma display, an electronic paper display, or any other type of technology. Although not illustrated, the user device 104 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The user device 104 may additionally include, or be associated with, an input device(s), such as a keyboard, a mouse, a pen, a voice input device, a touch input device, etc. The memory 404 may include an appointment module 410, a customer ordering module 412, and a location module 414.

The appointment module 410 may interface with the user 112 to enable the user 112 to schedule an appointment with the merchant 110. For example, the appointment module 410 may display a calendar of the merchant 110 (e.g., via the user interface 120) with information indicating time slots that are available and time slots that are unavailable (due to an appointment and/or being designated as unavailable). The user 112 may request an appointment by selecting a particular time slot, calling the merchant 110 (based on contact information that is provided), sending a notification to the merchant 110 (e.g., sending an email, text message, post, etc.), and so on. In some instances, the user 112 may be given access to different calendar information than that made available to the merchant 110. For example, a calendar may show a merchant as available or unavailable without showing the underlying reason (e.g., without indicating whether the unavailability is due to an appointment or a block of time that is designated by the merchant as unavailable). The appointment module 410 may also enable the user 112 to update an existing appointment (e.g., reschedule, change an item being requested for an appointment, etc.). The appointment module 410 may generally operate in cooperation with the service provider 102, such as the user interaction module 214.

The customer ordering module 412 may provide functionality to enable the user 112 to order an item and/or process a transaction for the item. The customer ordering module 412 may provide various interfaces and/or dashboards. For example, the customer ordering module 412 may provide information via an interface regarding merchants that are within a predetermined proximity to the user 112. The user 112 may select a merchant and order an item with the merchant. Additionally, or alternatively, the customer ordering module 412 may enable the user 112 to provide payment for an item (e.g., via a card reader, NFC connection to a customer device, Bluetooth® connection to customer device, etc.), receive receipts for items, and so on.

Further, the customer ordering module 412 may enable the user 112 to check in to a merchant to carry out a card-less payment transaction. Moreover, the customer ordering module 412 may provide a variety of other functionality to order an item and/or process a transaction.

The location module 414 may determine a location of the user 112 (e.g., the user device 104). In some instances, the location is provided to the service provider 102, or used locally, to facilitate various functions, such as processing of transactions when a customer is located within a particular proximity to the merchant 110. The location module 414 may determine a geographic location of the user device 104 from geolocation techniques (e.g., satellite-based systems—global positioning system (GPS)), cell tower location data, wireless access point location data, wireless beacon location, and so forth.

The memory 204 of the service provider 102, the memory 304 of the merchant device 106, and/or the memory 404 of the user device 104 (as well as all other memory described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

FIGS. 5-11 illustrate example processes 500, 600, 700, 800, 900, 1000, and 1100 for employing the techniques described herein. For ease of illustration the processes 500, 600, 700, 800, 900, 1000, and 1100 are described as being performed in the architecture 100 of FIG. 1. For example, one or more of the individual operations of the processes 500, 600, 700, 800, 900, 1000, and 1100 may be performed by the service provider 102, the user device 104, the merchant device 106, or other devices. However, the processes 500, 600, 700, 800, 900, 1000, and 1100 may be performed in other architectures. Moreover, the architecture 100 may be used to perform other processes.

The processes 500, 600, 700, 800, 900, 1000, and 1100 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the described operations may be omitted.

Figure 5:
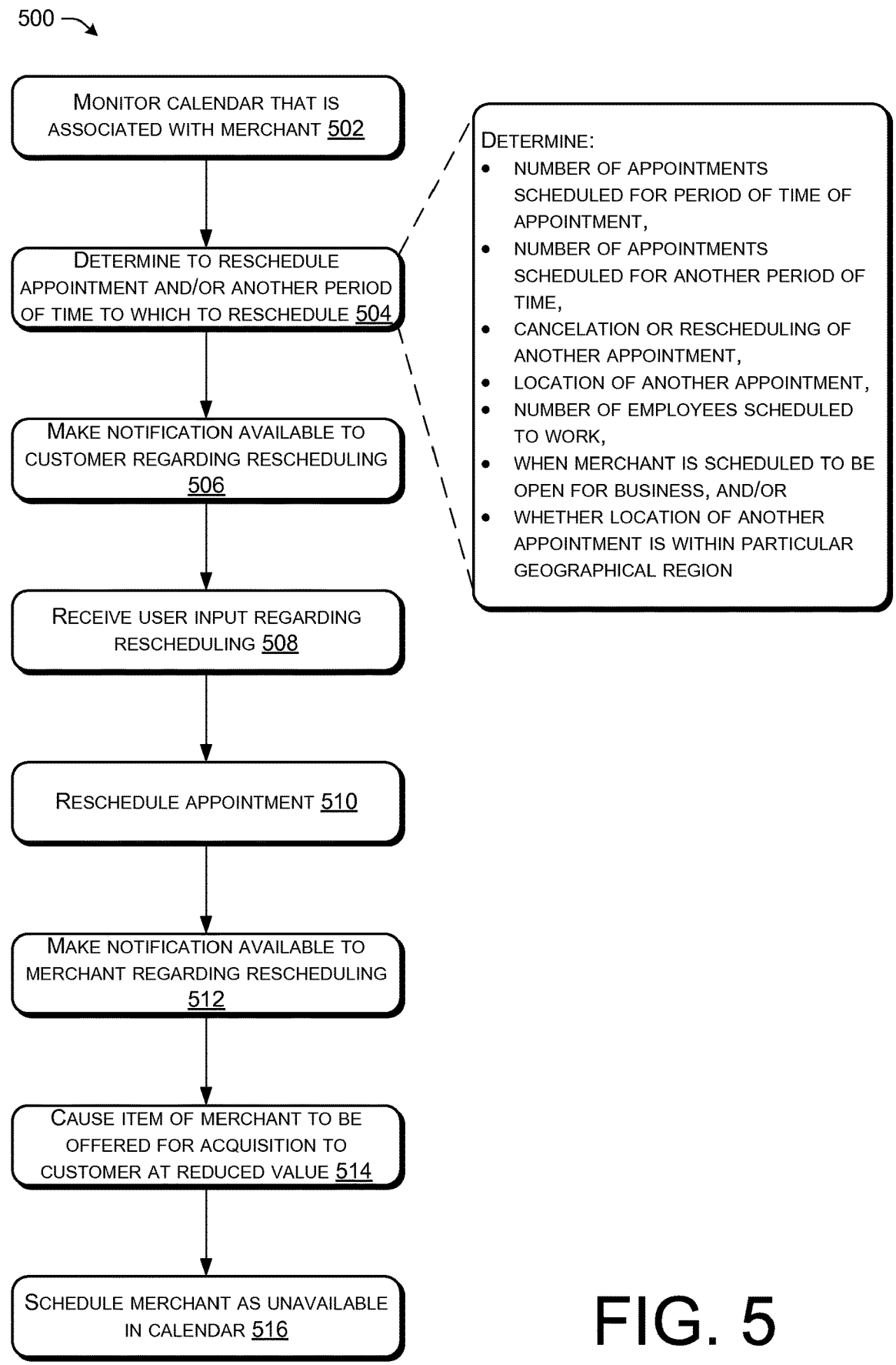
FIG. 5 illustrates an example process to reschedule an appointment to consolidate appointments in a calendar.

FIG. 5 illustrates the example process 500 to reschedule an appointment to consolidate appointments in a calendar.

At 502, the service provider 102 may monitor a calendar that is associated with a merchant. The operation 502 may generally include identifying the calendar associated with the merchant and identifying changes that are made to the calendar. For example, the service provider 102 may detect interactions with the calendar regarding the merchant's schedule, such as adding appointments, removing appointments, rescheduling appointments, updating appointments, etc.

At 504, the service provider 102 may determine to reschedule an appointment from a period of time and/or determine another period of time to which to reschedule the appointment. The determination(s) at 504 may be based on the monitoring. In some instances, the operation 504 is performed based on (or in response to) determining that the period of time is less than a threshold time away, such as less than a predetermined number of hours, days, or weeks away. For example, if an appointment is scheduled for Wednesday, the service provider 102 may determine whether or not to reschedule the appointment the Friday before. In other instances, the operation 504 may be performed at other times. A period of time may generally refer to a period of minutes, hours, days, weeks, months, etc.

The operation 504 may include determining a number of appointments scheduled for a period of time associated with an appointment. For example, the service provider 102 may determine to reschedule an appointment if less than a threshold number of appointments are scheduled for a period of time associated with the appointment. To illustrate, if only one appointment is scheduled for Thursday, the service provider 102 may determine to reschedule the appointment to another day since less than two appointments are scheduled for Thursday.

The operation 504 may also include determining a number of appointments scheduled for another period of time, such as a period of time associated with another appointment. For example, the service provider 102 may determine to reschedule an appointment from a time slot during a period of time to a time slot during another period of time if more than a threshold number of appointments are scheduled for the other period of time. To illustrate, if more than a threshold number of appointments are scheduled for Friday, the service provider 102 may determine to reschedule an appointment on Thursday to a time slot on Friday.

Further, the operation 504 may include determining that more appointments are scheduled for a particular period of time than another period of time. To illustrate, if more appointments are scheduled for Friday than Thursday, the service provider 102 may determine to reschedule an appointment on Thursday to Friday.

Alternatively, or additionally, the operation 504 may include determining that another appointment has been canceled or rescheduled. To illustrate, assume that one appointment is scheduled for Thursday and three appointments are scheduled for Friday. If one of the Friday appointments is canceled (or rescheduled to another day), the service provider 102 may determine to reschedule the Thursday appointment to Friday. This may allow a time slot of the canceled appointment on Friday to be filled and/or make available more time for the merchant on Thursday. Here, the Thursday and Friday appointments are within a predetermined window of time, namely as a number of days.

However, the predetermined window of time may comprise any amount of time, such as a number of minutes, hours, days, weeks, months, etc.

The operation 504 may also include determining a location of another appointment. A location of an appointment may generally be where a merchant and a customer perform at least a portion of a transaction, such as exchanging an item for money. A location of an appointment may be at a customer's residence, merchant's location, remote location to the merchant's location, or any other location. For example, the service provider 102 may determine to reschedule an appointment if a location of another appointment is within a predetermined proximity to a location of the appointment. To illustrate, assume again that one appointment is scheduled for Thursday, three appointments are scheduled for Friday, and one of the Friday appointments cancels. If the Thursday appointment is within a predetermined proximity to one of the remaining Friday appointments, the service provider 102 may determine to reschedule the Thursday appointment to fill the canceled Friday time slot.

In addition, the operation 504 may include determining a number of employees scheduled to work during a period of time. To illustrate, if more than a threshold number of employees are scheduled to work on a particular Friday, the service provider 102 may determine to reschedule an appointment on another day of the week to Friday. In some instances, the determination may additionally, or alternatively, be based on the types of employees that are scheduled to work. For example, an appointment may be determined to be rescheduled to Friday if a predetermined number of non-management (or alternatively management) employees are scheduled to work on Friday.

Similarly, the operation 504 may include determining when a merchant is scheduled to be open for business. For example, if the merchant is scheduled to be open on a particular day during the week, the service provider 102 may determine to reschedule an appointment for another day of the week to the particular day on which the merchant will be open.

Further, the operation 504 may include determining whether a location of an appointment is within a predetermined geographical region. For example, the service provider 102 may determine geographical regions that are frequently visited by a merchant (e.g., more than a threshold number of times) and when those geographical regions are visited. If the service provider 102 determines to reschedule an appointment, the service provider 102 may identify a geographical region that encompasses a location associated with the appointment and determine to reschedule the appointment to a period of time (e.g., day, week, month, etc.) when the merchant typically visits the geographical region. To illustrate, if a merchant typically visits a downtown region on Mondays (e.g., more that a threshold number of times), and the service provider 102 determines to reschedule an appointment for a massage at a customer's residence that is located in the downtown region, the service provider 102 may determine to reschedule the appointment to a Monday.

At 506, the service provider 102 may make a notification available to a customer regarding rescheduling of an appointment. This may include sending the notification to a device associated with the customer (e.g., via a text message, email, notification in an application, or other message), causing the notification to be presented via a user interface for the customer (e.g., a customer-facing interface that displays a calendar for the user), and so on. The notification may generally request that the customer reschedule an appointment with the merchant to a different time than the scheduled time. In some instances, the notification may suggest a particular period of time to which to reschedule, such as a particular day, week, month, etc. In other instances, the notification may merely request that the customer select a period of time. Further, in some instances the notification may indicate that an item of the merchant is being offered for acquisition at a reduced value for rescheduling the appointment. For example, the merchant may provide a discount on an item, promotional item, coupon for an item, and so on, in order to compensate the customer for rescheduling the appointment.

At 508, the service provider 102 may receive user input regarding rescheduling of the appointment. In some instances, the user input may be received from a device associated with the customer in the form of a text message, email, another electronic message, or other data. In other instances, the user input may be received via a user interface that is provided to the customer (e.g., the user's selection of a confirmation button confirming a suggested time slot, the user's selection of a particular time slot on a calendar, etc.). The user input may specify whether or not the user would like to reschedule the appointment and/or a time for rescheduling the appointment (e.g., a particular hour, day, week, month, etc.).

At 510, the service provider 102 may reschedule the appointment for the customer. The rescheduling may including moving the appointment with the customer in a calendar that is associated with the merchant. In some instances, the rescheduling is performed based on the user input received at 508. In other instance, the rescheduling is performed automatically and/or in response to response to other events. Additionally, or alternatively, the rescheduling may be performed based on the determination at 504 (e.g., the determination to reschedule and/or the determination of a period of time to which to reschedule).

At 512, the service provider 102 may make a notification available to the merchant regarding the rescheduling of the appointment. This may include sending the notification to a device associated with the merchant (e.g., via a text message, email, notification in an application, or other message), causing the notification to be presented via a user interface for the merchant (e.g., a merchant-facing interface that displays a calendar), and so on. The notification may generally indicate that an appointment with a customer has been rescheduled. The notification may identify the customer, a time to which the appointment has been rescheduled, a location of the appointment, or any other details about the appointment.

At 514, the service provider 102 may cause an item of the merchant to be offered for acquisition to the customer at a reduced value. This may include informing the customer of a discount on an item, promotional item, coupon for an item, and so on, to compensate the customer for rescheduling the appointment. Although the operation 514 is discussed as being performed by the service provider 102, in some instances this operation may be performed by a merchant device.

At 516, the service provider 102 may schedule the merchant as unavailable in a calendar for a period of time. In one example, if an appointment has been rescheduled from 3-4 PM on Monday, the service provider 102 may set the merchant as unavailable in the calendar from 3-4 PM on Monday. This may be based on a determination that the merchant has previously rescheduled appointments from this period of time and/or otherwise desires to have the particular period of time blocked out as unavailable. In another example, if a remaining (or only) appointment on Tuesday has been rescheduled to another day, the service provider 102 may set the merchant as unavailable in the calendar for Tuesday (e.g., all day, all normal business hours, specific time slots, etc.).

Figure 6:
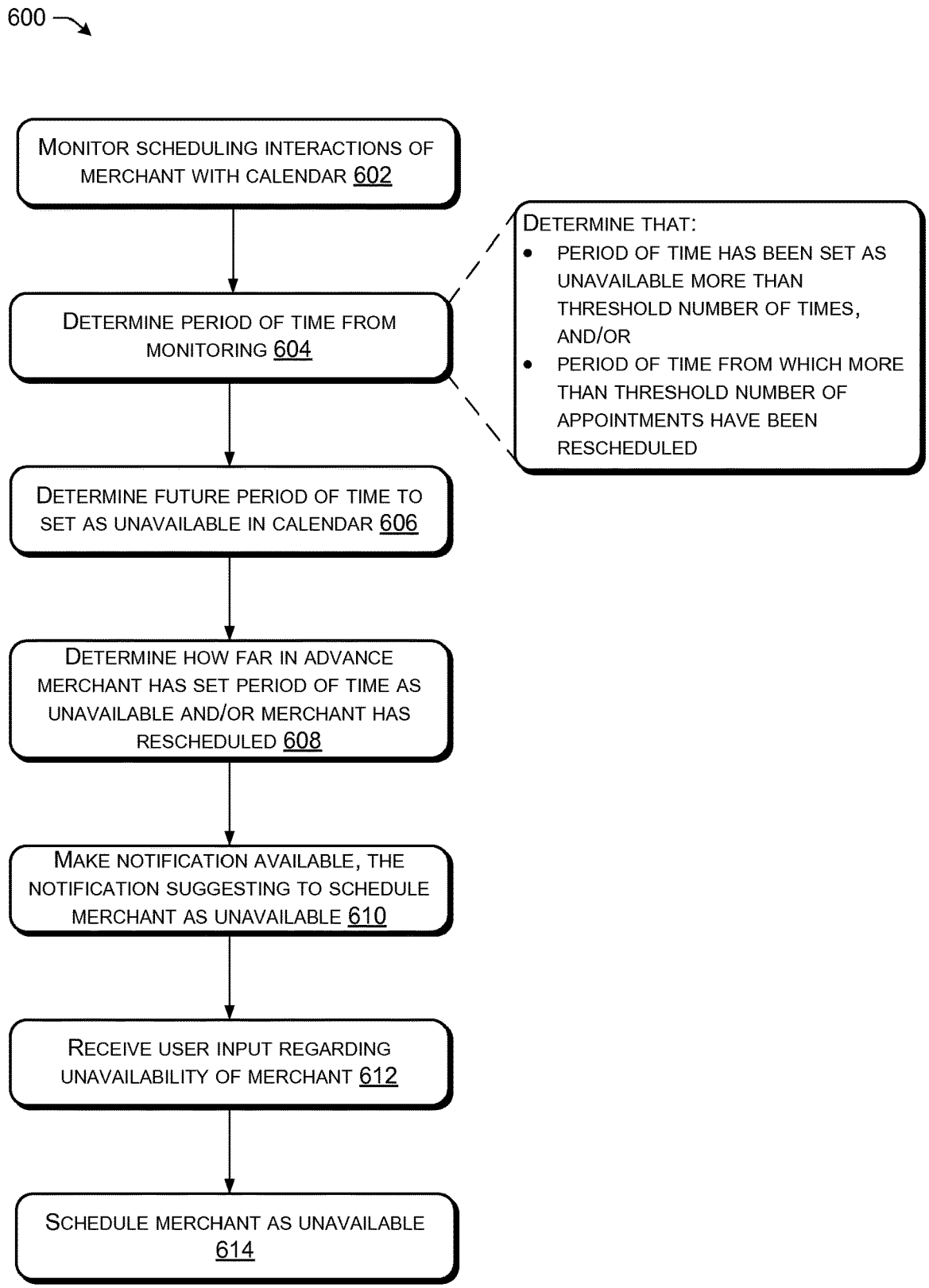
FIG. 6 illustrates an example process to schedule a merchant as unavailable during a period of time.

FIG. 6 illustrates the example process 600 to schedule a merchant as unavailable during a period of time.

At 602, the service provider 102 may monitor scheduling interactions of a merchant with a calendar. The calendar may be made available to the merchant and/or customers to schedule appointments with the merchant. The operation 602 may generally include identifying the calendar associated with the merchant and identifying changes that are made to the calendar. For example, the service provider 102 may detect interactions with the calendar regarding the merchant's schedule, such as adding appointments, removing appointments, rescheduling appointments, updating appointments, marking time periods as unavailable, etc.

At 604, the service provider 102 may determine a period of time from the monitoring. In some examples, the service provider 102 may determine a period of time has been set in the calendar, more than a threshold number of times, as unavailable for customers to schedule appointments with the merchant. For instance, it may be determined that the merchant frequently (more than a threshold number of times) blocks out Mondays from 12-6 PM as being unavailable. Alternatively, or additionally, the service provider 102 may determine a period of time from which more than a threshold number of appointments have been rescheduled. For instance, it may be determined that the merchant frequently (more than a threshold number of times) reschedules appointments that are scheduled on Tuesdays from 10 AM-12 PM.

At 606, the service provider 102 may determine a future period of time to set as unavailable in a calendar based on the period of time that is determined at the operation 604. In other words, the service provider 102 may identify a future period of time that corresponds to a previous period of time which has been set as unavailable and/or from which appointments have been rescheduled. The future period of time may be deemed to be of a particular level of interest for the merchant to set as unavailable. For example, if the first Mondays of January and February have been set in the calendar by the merchant as being unavailable for scheduling appointments, the service provider 102 may identify the first Monday of March as potentially being of interest to the merchant to set as unavailable.

At 608, the service provider 102 may determine how far in advance the merchant set the period of time (determined at the operation 604) as unavailable in the calendar and/or the merchant rescheduled from the period of time. That is, the service provider 102 may determine an amount of time between (i) setting a period of time as unavailable or rescheduling an appointment from the period of time and (ii) the start of the period of time. In one example, it may be determined that on Monday the merchant sets Wednesday as being unavailable for scheduling appointments with the merchant. As such, here the merchant sets unavailability two days in advance. In another example, it may be determined that the merchant has rescheduled a particular number of appointments four days prior to the scheduled appointments. The operation 608 may include determining on average or for a specific instance how far in advance a period of time is set as unavailable or the merchant has rescheduled from the period of time, such as an average number of minutes, hours, days, weeks, months, etc.

At 610, the service provider 102 may make a notification available to the merchant suggesting that the merchant be scheduled as unavailable in the calendar during the future period of time (determined at 606). This may include sending the notification to a device associated with the merchant (e.g., via a text message, email, notification in an application, or other message), causing the notification to be presented via a user interface for the merchant (e.g., a merchant-facing interface that displays a calendar), and so on. The notification may suggest a particular time slot for setting as unavailable (e.g., next Monday at 3 PM).

In some examples, the notification is made available to the merchant based on how far in advance the merchant has set a period of time as unavailable and/or has rescheduled an appointment (the determination at the operation 608). In one instance, if the merchant frequently sets Mondays as unavailable in the calendar on Friday, a notification may be provided to the merchant on Friday suggesting that Monday be scheduled as unavailable. Alternatively, or additionally, the notification for scheduling unavailability of the merchant may be provided any number of hours, days, weeks, months, etc. in advance of a particular time at which the calendar is generally set as unavailable and/or at which an appointment is rescheduled. In returning to the illustration above where Mondays are frequently set as unavailable on Friday, the notification may be provided on the Wednesday prior to the Monday, providing the merchant with additional advance notice to mark the calendar as unavailable.

At 612, the service provider 102 may receive user input regarding unavailability of the merchant. For example, if the notification suggests that the merchant be scheduled as unavailable next Monday, the user input may include a request of the merchant to be scheduled as unavailable next Monday. In some instances, the user input may be received from a device associated with the merchant in the form of a text message, email, another electronic message, or other data. In other instances, the user input may be received via a user interface that is provided to the merchant (e.g., the merchant's selection of a confirmation button confirming a suggested time slot to schedule as unavailable).

At 614, the service provider 102 may schedule the merchant as unavailable for the future period of time. This may encourage customers to schedule appointments for other future period of time. In some instances, the merchant may be scheduled as unavailable during the future period of time based on the user input received at the operation 612. In other instances, the merchant may be scheduled as unavailable automatically without having notified the merchant and/or without having received user input (e.g., without have performed the operation 610 and/or the operation 612).

Figure 7:
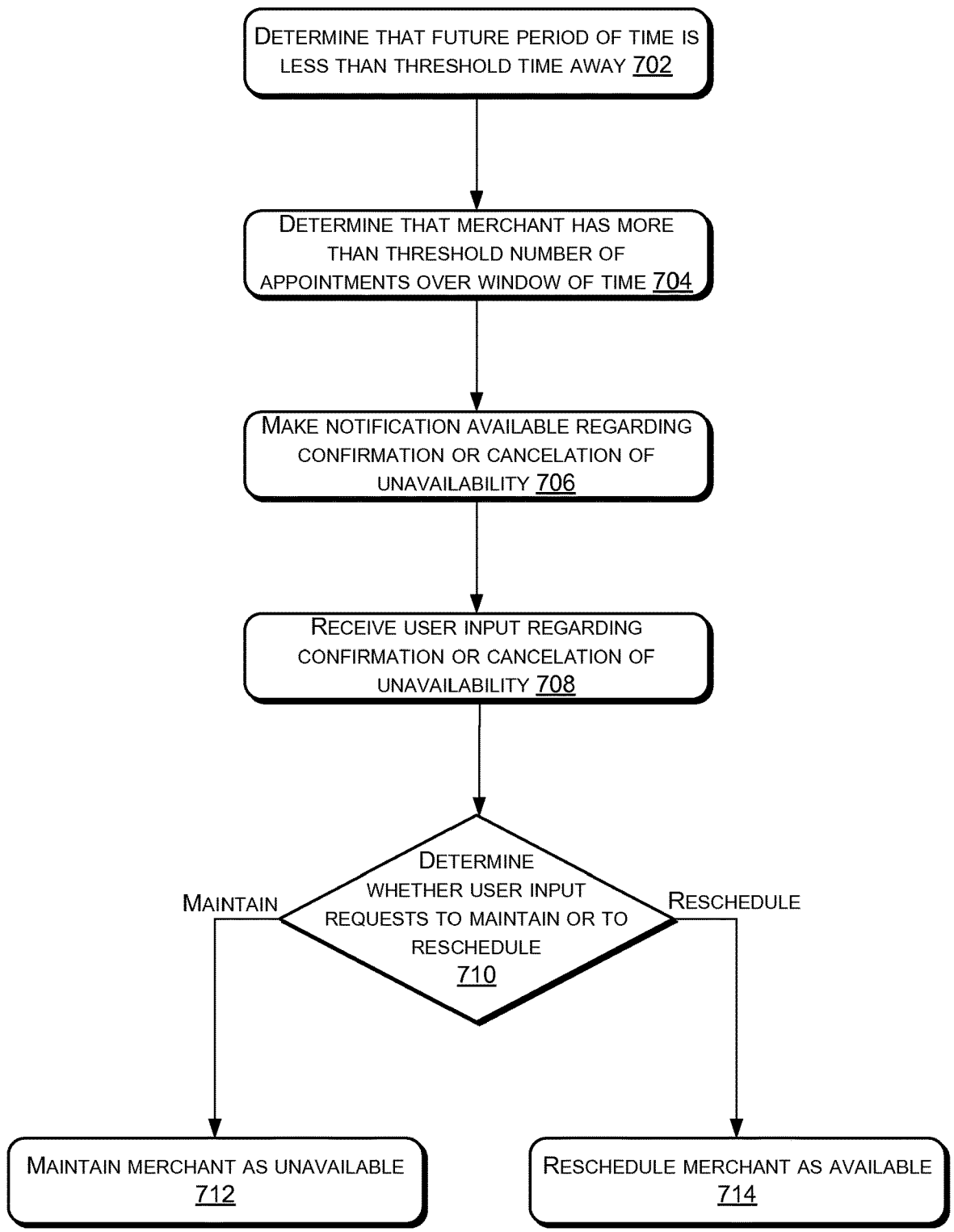
FIG. 7 illustrates an example process to notify a merchant about an upcoming period of time that is scheduled as unavailable and to maintain or remove the unavailability.

FIG. 7 illustrates the example process 700 to notify a merchant of about an upcoming period of time that is scheduled as unavailable and to maintain or remove the unavailability.

At 702, the service provider 102 may determine that a future period, for which a merchant is scheduled as unavailable, is less than a threshold time away. Here, the future period of time may have been scheduled as unavailable in a calendar through the process 600 of FIG. 6, for example. As such, at 702, the service provider 102 may determine that the future period of time is approaching (e.g., less than a particular number of hours, days, weeks, months, etc. away). For example, it may be determined that a particular Friday for which the merchant is scheduled as unavailable in the calendar is less than a week away.

At 704, the service provider 102 may determine that the merchant has more than a threshold number of appointments scheduled over a window of time before and/or after the future period of time that is set as unavailable. The window of time may comprise any number of hours, days, weeks, months, and so on that are before and/or after the future period of time. For example, if a Thursday is set in a calendar as unavailable for scheduling appointments, the service provider 102 may determine a number of appointments that are scheduled on the Wednesday before and the Friday after. Then, it may be determined if the number of appointments is greater than a threshold (e.g., indicating that the merchant is relatively busy around Thursday and may want to be available on Thursday now to obtain more business).

At 706, the service provider 102 may make a notification available to the merchant regarding confirmation or cancellation of the future period of time being set as unavailable. That is, the notification may request confirmation or cancellation of the scheduling of the merchant as unavailable in the calendar for the future period of time. The notification may identify the future period of time as being scheduled as unavailable. The operation 706 may include sending the notification to a device associated with the merchant, causing the notification to be presented via a user interface for the merchant, and so on. The operation 706 may be performed based on the determinations of the operation 702 and/or the operation 704.

At 708, the service provider 102 may receive user input regarding confirmation or cancellation of the scheduling of the merchant as unavailable in the calendar for the future period of time. In some instances, the user input may be received from a device associated with the merchant in the form of a text message, email, another electronic message, or other data. In other instances, the user input may be received via a user interface that is provided to the merchant. The user input may specify whether the merchant would like to maintain the future period of time as unavailable or would like to cancel the unavailability (e.g., reschedule the merchant as available).

At 710, the service provider 102 may determine whether the user input requests to maintain the merchant as unavailable during the future period of time or to reschedule the merchant as available during the future period of time. In response to determining that the user input requests to maintain the merchant as unavailable, the process 700 may proceed to operation 712, where the calendar may maintain the merchant as unavailable during the future period of time (e.g., leave the calendar as is). Alternatively, in response to determining that the user input requests to reschedule the merchant, the process 700 may proceed to operation 714, where the merchant is rescheduled as available in the calendar for the future period of time (e.g., set the future period of time in the calendar as available). This may allow the merchant to obtain appointments for the future period of time.

Figure 8:
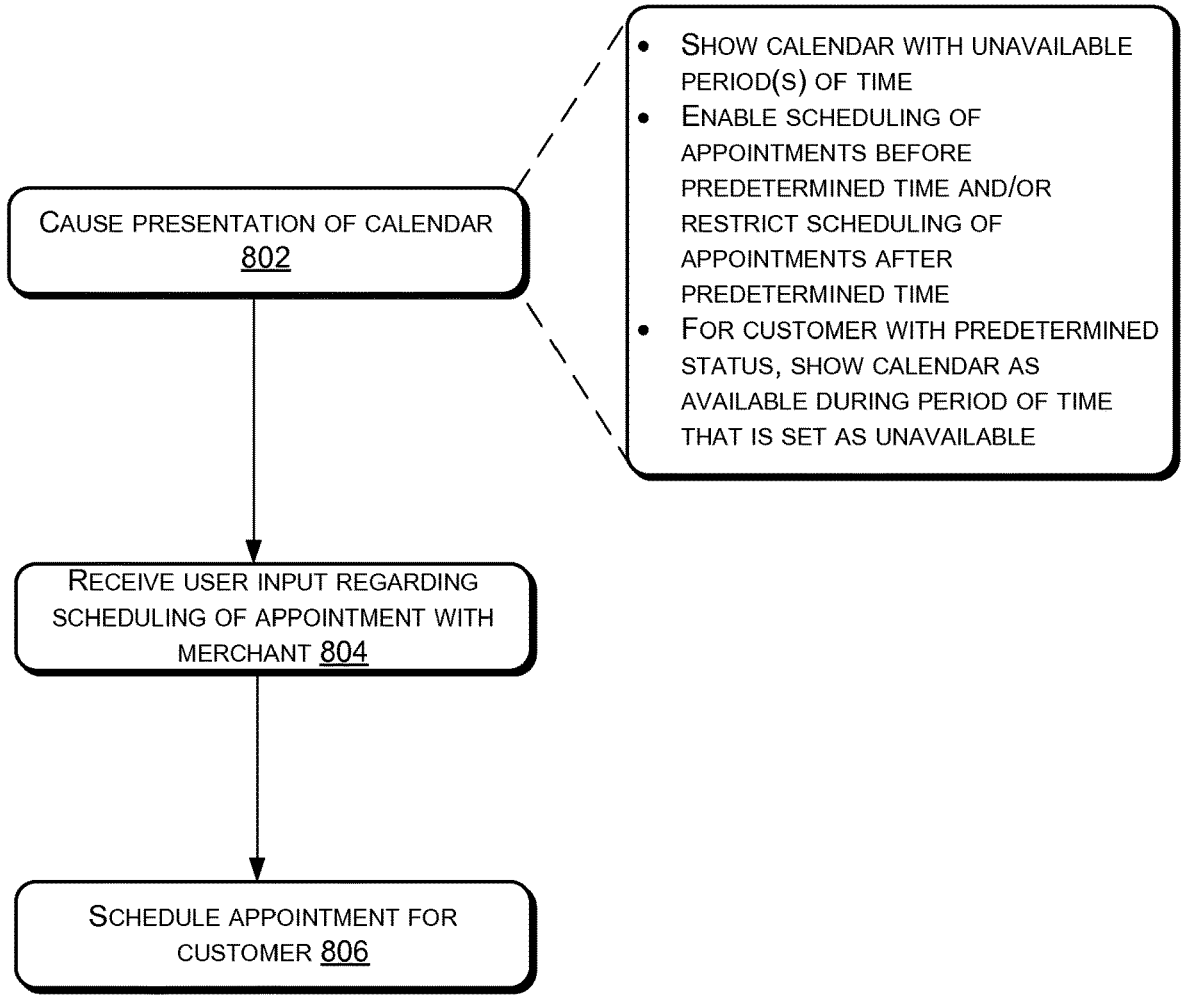
FIG. 8 illustrates an example process to present a calendar of a merchant's schedule and to schedule an appointment.

FIG. 8 illustrates the example process 800 to present a calendar of a merchant's schedule and to schedule an appointment.

At 802, the service provider 102 may cause presentation of a calendar that is associated with a merchant. In some instances, the calendar (e.g., a visual representation of the calendar) is displayed via a user interface, such as a merchant-facing interface, customer-facing interface, or another interface. In other instances, the calendar is output in an audible or other manner via a computing device. The calendar may enable the merchant and/or customers to schedule appointments with the merchant. The calendar may present periods of time that are scheduled as unavailable, periods of time for which appointments have been scheduled, periods of time that are available, and so on. In some instances, a period of time that is set as unavailable may be designated (e.g., shown) differently than a period of time that is associated with an appointment. In other instances, periods of time associated with unavailability and periods of time associated with appointments may be designated the same. The operation 802 may be performed after a merchant has been scheduled as unavailable in the calendar, after a period of time set as unavailable has been rescheduled to available, or at any other time.

In some examples, at 802, the service provider 102 may enable scheduling of appointments before a predetermined time and/or restrict scheduling of appointments after the predetermined time. For example, the service provider 102 may allow customers to view the calendar and/or schedule appointments that are within the next two weeks and restrict customers from viewing and/or scheduling appointments that are more than two weeks out.

Further, in some examples at 802, the calendar may be presented differently for different types of users. For instance, the service provider 102 may associate a predetermined status with a customer based on transaction information indicating that more than a threshold number of items have been acquired from the merchant by the customer. The predetermined status may generally indicate that the customer is a preferred customer (e.g., has conducted a number of transactions with the merchant). When the customer with the predetermined status requests to access the calendar, the service provider 102 may show a period of time that is scheduled as unavailable in the calendar (e.g., for other users) as available for the customer, so that the customer may schedule an appointment. This may allow, for example, a customer that is associated with a preferred status to be provided with additional options for appointments, in comparison to other customers.

At 804, the service provider 102 may receive user input regarding scheduling of an appointment with the merchant. In some instances, the user input may be received from a device associated with the merchant and/or customer in the form of a text message, email, another electronic message, or other data. In other instances, the user input may be received via a user interface. The user input may specify a time slot for the appointment. Further, in some instances the user input may request an appointment for a time slot that was previously set as unavailable in the calendar.

At 806, the service provider 102 may schedule an appointment with the merchant. This may include scheduling the appointment in the calendar. The operation 806 may be based on the user input that is received at the operation 804.

Figure 9:
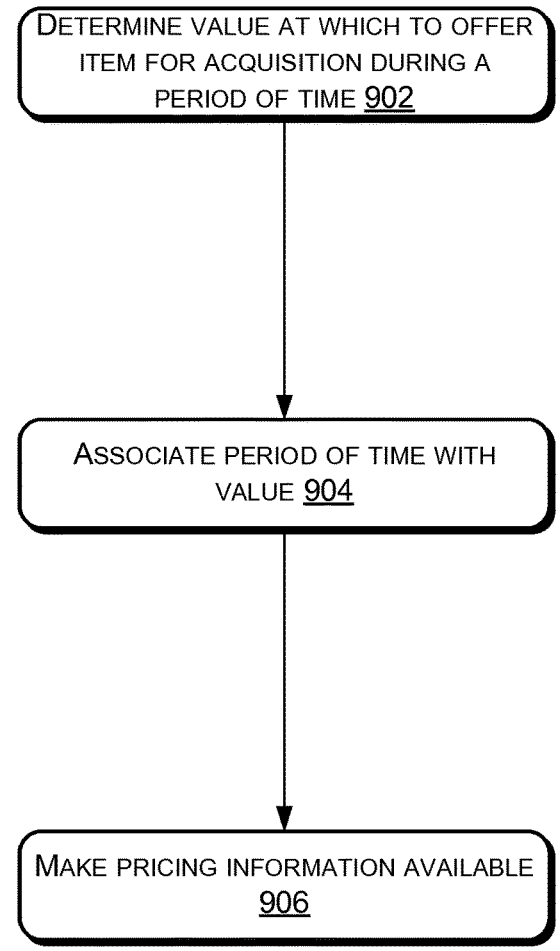
FIG. 9 illustrates an example process to determine a value at which to offer an item for acquisition during a period of time and associate the period of time with the value.

FIG. 9 illustrates an example process to determine a value at which to offer an item for acquisition during a period of time and to associate the period of time with the value.

At 902, the service provider 102 may determine a value (e.g., price) at which to offer an item for acquisition during a period of time. The determination may be based on a merchant rescheduling from the period of time, setting the period of time as unavailable, and so on. For example, the service provider 102 may determine to offer an item for acquisition at a relatively high price (in comparison to a normal price of the item) on Mondays when the merchant has frequently rescheduled appointments from Mondays or the merchant has frequently set Monday as unavailable in the calendar.

At 904, the service provider 102 may associate the period of time with the value. That is, the item that is offered for acquisition during the period of time may be offered at the value. In one example, an appointment that is scheduled for the period of time may acquire the item at the value.

At 906, the service provider 102 may make pricing information available for the item. When the pricing information is being made available for the period of time, the pricing information may indicate the value. For example, if a price of the item is increased on a particular Monday, in order to encourage customers to schedule appointments on other days of the week, then customers that are attempting to schedule an appointment on the particular Monday may view the increased price of the item. In some instances, the pricing information may indicate both the value at which the item is generally being offered for acquisition and the value at which the item is being offered for acquisition during the period of time (e.g., indicating a difference between the two values). The operation 906 may include sending the pricing information to a device associated with a customer (e.g., via a text message, email, notification in an application, or other message), causing the pricing information to be presented via a user interface, and so on.

Figure 10:
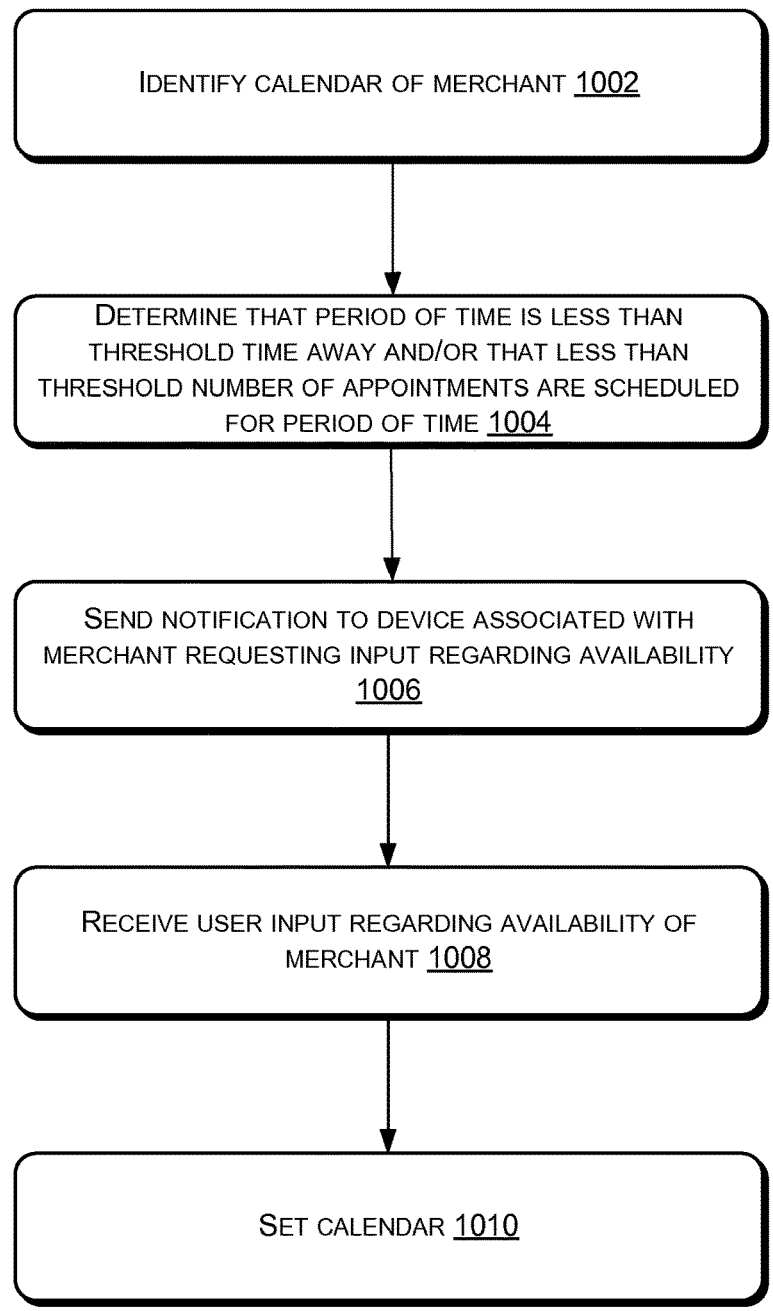
FIG. 10 illustrates an example process to schedule a merchant as unavailable based on a number of appointments that are scheduled for a period of time.

FIG. 10 illustrates the example process 1000 to schedule a merchant as unavailable based on a number of appointments that are scheduled for a period of time.

At 1002, the service provider 102 may identify a calendar that is associated with a merchant. This may include referencing account information for the merchant to identify a calendar that is linked to the account information.

At 1004, the service provider 102 may determine that a period of time in the calendar is less than a threshold time away and/or that less than a threshold number of appointments are scheduled for the period of time. For example, it may be determined that no appointments are scheduled for next Monday, which is two days away. Alternatively, it may be determined that only one appointment is scheduled for Monday.

At 1006, the service provider 102 may send a notification to a device associated with a merchant. The notification may request input regarding an availability of the merchant for the period of time. For example, the notification may ask if the merchant would like to designate Monday as unavailable since no appointments are scheduled for Monday.

At 1008, the service provider 102 may receive user input from the device associated with the merchant. In some instances, the user input may request that the merchant be scheduled as unavailable during the period of time, while in other instances the user input may request to not schedule the merchant as unavailable.

At 1010, the service provider 102 may set the calendar. In some instances, the calendar is set automatically based on the determination of the operation 1004. In other instances, the calendar is set based on the user input that is received at the operation 1008. For example, if the user input requests that the merchant be scheduled as unavailable during the period of time, the service provider 102 may schedule the merchant as unavailable.

Figure 11:
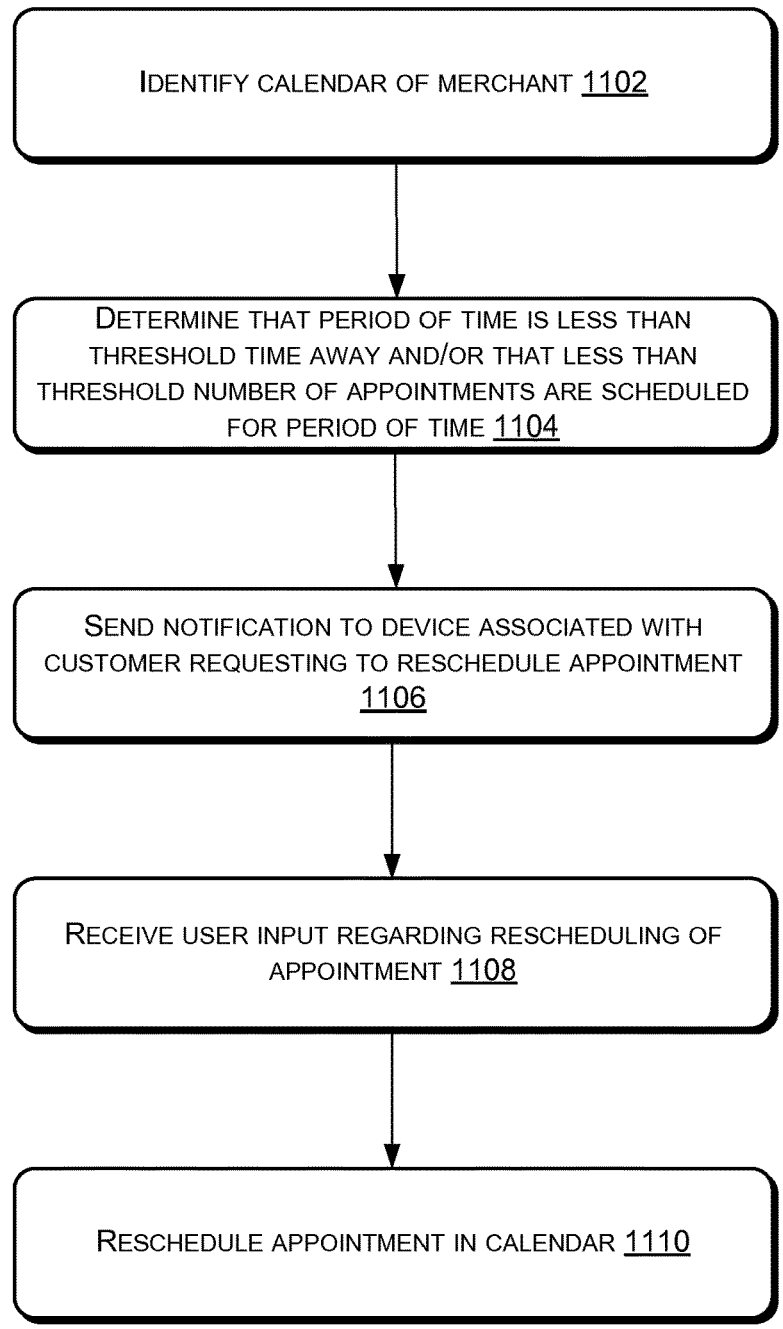
FIG. 11 illustrates an example process to reschedule an appointment when less than a threshold number of appointments are scheduled.

FIG. 11 illustrates the example process 1100 to reschedule an appointment based on a number of appointments that are scheduled.

At 1102, the service provider 102 may identify a calendar of a merchant that offers one or more items for acquisition.

At 1104, the service provider 102 may determine that a period of time in the calendar is less than a threshold time away and/or that less than a threshold number of appointments are scheduled for the period of time.

At 1106, the service provider 102 may send a notification to a device associated with a customer requesting to reschedule the appointment. In some instances, the notification may suggest a time to which to reschedule.

At 1108, the service provider 102 may receive user input from the device that is associated with the customer. The user input may indicate whether or not the customer would like to reschedule the appointment. If the customer would like to reschedule, the user input may additionally identify a time to which to reschedule.

At 1110, the service provider 102 may reschedule an appointment in the calendar. In some instances, the appointment is automatically rescheduled based on the determination of the operation 1104. In other instances, the appointment is rescheduled based on user input that is received at the operation 1108. Further, in some instances, at 1110, the service provider 102 may reschedule the appointment based on determining that more than the threshold number of appointments are scheduled for another period of time, determining that a location of the appointment is within a predetermined proximity to a location of another appointment that is scheduled for the other period of time, determining that a threshold number of employees of the merchant are scheduled to work for the other period of time, determining that the merchant will be open for business for the other period of time, and/or determining that a location of the appointment is within a geographical region that has been visited by the merchant, more than a threshold number of times, on a same day, week, or month on which the other period of time falls.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method performed at least partly by one or more network-based service provider computing devices associated with a payment service and configured to communicate over one or more networks with a plurality of merchant devices, the method comprising:

executing, by a customer device of a customer, a location module on the customer device to receive a geolocation of the customer device from a global positioning system (GPS) of the customer device;

determining, by a customer ordering module executable by the customer device and based on the geolocation, that the customer device is within a predetermined proximity to a merchant device of the plurality of merchant devices associated with a merchant of a plurality of merchants; and generating, by the customer ordering module and in response to determining that the customer device is within the predetermined proximity, a user interface that displays an item associated with an appointment for selection, wherein the appointment is scheduled between the customer and the merchant, and wherein the appointment is capable of being rescheduled;

receiving, over a network, by the one or more network-based service provider computing devices and from the customer device of the customer, the geolocation of the customer;

receiving, by the one or more network-based service provider computing devices and from the plurality of merchant devices, point-of-sale (POS) transaction data associated with a plurality of POS transactions corresponding to the plurality of merchants, including the merchant;

monitoring, by the one or more network-based service provider computing devices, an electronic calendar of a calendar application that is associated with the merchant of the plurality of merchants, wherein:
 the calendar application enables customers of the merchant to schedule appointments with the merchant; and
 the electronic calendar indicates that a first appointment and second appointment are scheduled on a first day and a third appointment is scheduled on a second day, wherein the third appointment is the appointment associated with the item on the user interface;
receiving, by the one or more network-based service provider computing devices, an indication that the first appointment has been canceled;
based at least in part on receiving the indication:
 determining, by the one or more network-based service provider computing devices and responsive to the first appointment being canceled, that fewer than a threshold number of appointments are scheduled for the second day in the electronic calendar;
 identifying, by the one or more network-based service provider computing devices and based at least in part on a portion of the POS transaction data associated with the merchant, a geographic region that the merchant has previously visited more than a threshold number of times and on a same day of a week as the first day;
 determining, by the one or more network-based service provider computing devices, that the third appointment should be rescheduled to the first day based on determining that the geolocation associated with the customer is within the geographical region;
 rescheduling, by the one or more network-based service provider computing devices, the third appointment to the first day in the electronic calendar; and
 receiving, by the one or more network-based service provider computing devices and based at least in part on the rescheduling within the electronic calendar, a selection of the item associated with the third appointment via the user interface of the customer device.

2. The method of claim 1, further comprising:
causing a notification to be presented via the user interface of the customer device, wherein the notification indicates that at least one item of the merchant is being offered for acquisition at a reduced value for rescheduling the third appointment to the first day.

3. The method of claim 1, further comprising:
determining that more than the threshold number of appointments are scheduled for the first day; and
wherein the rescheduling the third appointment further comprises rescheduling the third appointment to the first day based at least in part on the determining that more than the threshold number of appointments are scheduled for the first day.

4. A calendar scheduling system implementing a payment service for communicating between a service provider computing device and a plurality of merchant devices, the system comprising:
 a location module executing on a customer device of a customer, the location module being configured to receive a geolocation of the customer device from a global positioning system (GPS) of the customer device;
 a customer ordering module executing on the customer device, the customer ordering module being configured to:
  determine, from the geolocation, that the customer device is within a predetermined proximity to a merchant device of the plurality of merchant devices associated with a merchant of a plurality of merchants; and
  generate, in response to determining that the customer device is within the predetermined proximity, a user interface that displays an item associated with an appointment for selection, wherein the appointment is scheduled between the customer and the merchant, and wherein the appointment is capable of being rescheduled; and
 a server associated with the payment service, the server comprising:
  one or more processors; and
  memory communicatively coupled to the one or more processors and storing instructions that, when executed, cause the one or more processors to:
   receive, over a network, from the customer device of the customer, the geolocation of the customer;
   receive, from the plurality of merchant devices, point-of-sale (POS) transaction data associated with a plurality of POS transactions corresponding to the plurality of merchants, including the merchant;
   monitor an electronic calendar of a first calendar application that is associated with the merchant of the plurality of merchants, wherein:
    the first calendar application enables customers of the merchant to schedule appointments with the merchant; and
    the electronic calendar has a first appointment and a second appointment scheduled for a first period of time and a third appointment scheduled during a second period of time, wherein the second appointment is the appointment associated with the item on the user interface;
   receive a first indication that the first appointment has been canceled;
   based at least in part on receiving the first indication:
    determine, responsive to the first appointment being canceled, that the electronic calendar indicates fewer than a threshold number of appointments are scheduled for the first period of time;
    identify, based at least in part on a portion of the POS transaction data associated with the merchant, a geographic region that the merchant has previously visited more than a threshold number of times and during a same period of time as the second period of time;
    determine that the second appointment should be rescheduled to the second period of time based at least in part on determining that the geolocation associated with the customer is within the geographical region;
    reschedule the second appointment to a time during the second period of time in the electronic calendar; and
    receive, based at least in part on the rescheduling in the electronic calendar, a selection of the item associated with the second appointment via the user interface of the customer device.

5. The system of claim 4, further comprising:
analyzing the portion of the POS transaction data to determine that a threshold number of employees of the merchant are scheduled to work for the second period of time.

6. The system of claim 4, further comprising determining that the second appointment should be rescheduled to the second period of time further based at least in part on determining that the merchant will be open for business during the second period of time.

7. The system of claim 4, further comprising determining that the second appointment should be rescheduled to the second period of time based at least in part on determining that the merchant has previously visited the geographical region more than the threshold number of times on a same day, week, or month of the second period of time.

8. The system of claim 4, further comprising determining that the second appointment should be rescheduled to the second period of time further based at least in part on determining that more than the threshold number of appointments are scheduled for the second period of time.

9. The system of claim 4, further comprising based at least in part on rescheduling the second appointment to the second period of time, causing at least one item of the merchant to be offered for acquisition to the customer at a reduced value.

10. The system of claim 4, further comprising causing a merchant computing device of the merchant to present a second indication that at least one item of the merchant is being offered for acquisition at a reduced value for rescheduling the second appointment to the second period of time.

11. The system of claim 4, further comprising:
determining that the first period of time is less than a threshold time away; and
determining that the second appointment should be rescheduled to the second period of time further based at least in part on determining that the first period of time is less than the threshold time away.

12. The system of claim 4, wherein the POS transaction data includes location data, the location data comprising at least one of:
GPS data;
cell tower location data;
wireless access point location data; or
wireless beacon location data.

13. The system of claim 4, further comprising:
determining a number of appointments scheduled during the second period of time;
determining a number of employees of the merchant that are scheduled to work for the second period of time;
determining that the number of employees is greater than a threshold number of employees to perform the number of appointments scheduled during the second period of time; and
causing a notification to be presented on the user interface of the customer device based at least in part on the number of employees scheduled to work during the second period of time being greater than the threshold number of employees for the number of appointments scheduled during the second period of time.

14. One or more non-transitory computer-readable media storing executable instructions that, when executed by one or more processors, cause the one or more processors to:
execute a first set of instructions associated with a location module, the first set of instructions causing the one or more processors to enable the location module to
receive a geolocation of a customer device of a customer from a global positioning system (GPS) of the customer device;
execute a second set of instructions associated with a customer ordering module executing on the customer device, wherein the second set of instructions cause the one or more processors to provide the customer ordering module to the customer device, the customer ordering module being configured to:
determine, from the geolocation, that the customer device is within a predetermined proximity to a merchant device of a plurality of merchant devices associated with a merchant of a plurality of merchants; and
generate, in response to determining that the customer device is within the predetermined proximity, a user interface that displays an item associated with an appointment for selection, wherein the appointment is scheduled between the customer and the merchant, and wherein the appointment is capable of being rescheduled; and
execute a third set of instructions associated with a server of a payment service, wherein the third set of instructions causes one or more processors of the server to perform operations comprising:
receiving, over a network, from the customer device of the customer, the geolocation of the customer;
receiving, from the plurality of merchant devices, point-of-sale (POS) transaction data associated with a plurality of POS transactions corresponding to the plurality of merchants, including the merchant;
monitoring an electronic calendar of a calendar application that is associated with the merchant of the plurality of merchants, wherein:
the calendar application enables a plurality of customers of the merchant to schedule appointments with the merchant; and
the electronic calendar has a first appointment and a second appointment scheduled for a first period of time and a third appointment scheduled for a second period of time, wherein the second appointment is the appointment associated with the item on the user interface;
receiving an indication that the first appointment has been canceled; based at least in part on receiving the indication:
determining, responsive to the first appointment being canceled, that the electronic calendar indicates fewer than a threshold number of appointments are scheduled with other customers for the first period of time;
identifying, based at least in part on a portion of the POS transaction data associated with the merchant, a geographic region that the merchant has previously visited more than a threshold number of times and during a same period of time as the second period of time;
determining, that the second appointment should be rescheduled to the second period of time based at least in part on determining that that the geolocation associated with the customer is within the geographical region;
rescheduling the second appointment to a time during the second period of time in the electronic calendar; and
receiving, based at least in part on the rescheduling within the electronic calendar, a selection of the item associated with the second appointment via the user interface of the customer device.

15. The one or more non-transitory computer-readable media of claim 14, further comprising: determining that more than the threshold number of appointments are scheduled on the electronic calendar for the second period of time; and determining that the second appointment should be rescheduled to the second period of time further based at least in part on determining that more than the threshold number of appointments are scheduled for the second period of time.

16. The one or more non-transitory computer-readable media of claim 15, further comprising:

determining that a threshold number of employees of the merchant are scheduled to work for the second period of time; and determining that the second appointment should be rescheduled to the second period of time further based at least in part on determining that the threshold number of employees of the merchant are scheduled to work for the second period of time.

17. The one or more non-transitory computer-readable media of claim 15, further comprising:

determining that the merchant will be open for business for the second period of time; and determining that the appointment should be rescheduled to the second period of time further based at least in part on determining that the merchant will be open for business for the second period of time.

18. The one or more non-transitory computer-readable media of claim 15, further comprising:

determining that the geographical region has been previously visited by the merchant more than the threshold number of times during the first period of time, on a same day, week, or month as the second period of time.

19. The one or more non-transitory computer-readable media of claim 14, further comprising:

upon rescheduling the second appointment, scheduling the merchant as unavailable in the electronic calendar for the first period of time.

20. The one or more non-transitory computer-readable media of claim 14, further comprising:

enabling scheduling of appointments in the electronic calendar for periods of time that are before a predetermined time and restricting scheduling of appointments in the electronic calendar for periods of time that are after the predetermined time.

* * * * *